(12) United States Patent
Falk

(10) Patent No.: US 9,170,321 B2
(45) Date of Patent: Oct. 27, 2015

(54) METHOD AND RADAR SYSTEM FOR REPETITION JAMMER AND CLUTTER SUPRESSION

(75) Inventor: Kent Falk, Goeteborg (SE)

(73) Assignee: SAAB AB, Linkoping (SE)

(\*) Notice: Subject to any disclaimer, the term of this patent is extended or adjusted under 35 U.S.C. 154(b) by 270 days.

(21) Appl. No.: 13/883,927

(22) PCT Filed: Nov. 19, 2010

(86) PCT No.: PCT/SE2010/051277
§ 371 (c)(1),
(2), (4) Date: May 7, 2013

(87) PCT Pub. No.: WO2012/067557
PCT Pub. Date: May 24, 2012

(65) Prior Publication Data
US 2013/0234877 A1    Sep. 12, 2013

(51) Int. Cl.
*G01S 7/36* (2006.01)
*G01S 7/292* (2006.01)
(Continued)

(52) U.S. Cl.
CPC ........ *G01S 7/36* (2013.01); *G01S 7/2813* (2013.01)

(58) Field of Classification Search
CPC ........... G01S 7/02; G01S 7/28; G01S 7/2813; G01S 7/36; G01S 7/285; G01S 7/288; G01S 7/292; G01S 7/2923; G01S 7/2925
USPC ......... 342/13–20, 82–93, 159–164, 175, 188, 342/192–197; 375/242, 316, 346–351; 455/39, 63.1–63.4, 65, 500, 501
See application file for complete search history.

(56) References Cited

U.S. PATENT DOCUMENTS 3,852,747 A \* 12/1974 Morand ..................... 342/15
4,293,953 A \* 10/1981 Gutleber .................... 375/242
(Continued)

FOREIGN PATENT DOCUMENTS

| EP | 0308229 A2 | 3/1989 |
|---|---|---|
| WO | WO 87/07389 A2 | 12/1987 |
| WO | WO 2006/130682 A1 | 12/2006 |

OTHER PUBLICATIONS

International Searching Authority, International Search Report for International Application No. PCT/SE2010/051277, mailed Jul. 19, 2011, 4 pages, The Swedish Patent and Registration Office, Sweden.
(Continued)

*Primary Examiner* — Bernarr Gregory
(74) *Attorney, Agent, or Firm* — Alston & Bird LLP

(57) ABSTRACT

A method for suppressing repetition jammer signals and/or clutter signals by using a radar system wherein said radar system comprises, at least one wideband arbitrary waveform generator, for creating arbitrary waveforms, and at least one antenna operating with wide instantaneous bandwidth, enabling direction dependent waveform radiation, wherein said method comprises the steps of transmitting different waveforms in different directions; adapting transmitted waveforms in different directions depending on received waveforms such that a normalised signal to noise-jammer ratio, NSNJR, is maximized; and thereby providing received signals from repetition jammers and/or clutter that are substantially orthogonal to a received signal from a target; thereby achieving suppression of the repetition jammers and/or clutter.

16 Claims, 13 Drawing Sheets

(51) Int. Cl.
  *G01S 7/28* (2006.01)
  *G01S 7/00* (2006.01)

(56) References Cited

U.S. PATENT DOCUMENTS

| | | | | |
|---|---|---|---|---|
| 4,359,736 A | * | 11/1982 | Lewis | 342/16 |
| 4,434,505 A | * | 2/1984 | Gutleber | 455/501 |
| 4,544,926 A | * | 10/1985 | Giuli | 342/19 |
| 4,660,042 A | * | 4/1987 | Ekstrom | 342/175 |
| 5,805,106 A | | 9/1998 | Baum | |
| 6,486,823 B1 | * | 11/2002 | Benson et al. | 342/14 |
| 8,107,906 B2 | * | 1/2012 | Lum et al. | 375/346 |

OTHER PUBLICATIONS

International Searching Authority, Written Opinion for International Application No. PCT/SE2010/051277, mailed Jul. 19, 2011, 4 pages, The Swedish Patent and Registration Office, Sweden.

* cited by examiner

| $\vec{n}_s=0$ | $\vec{m}=0$ $e^{j\frac{\pi}{2}}=0+j\cdot1$ | $\vec{m}=1$ $e^{j\frac{\pi}{2}}=0+j\cdot1$ | $\vec{m}=2$ $e^{j\frac{\pi}{2}}=0+j\cdot1$ | $\vec{m}=3$ $e^{j\frac{\pi}{2}}=0-j\cdot1$ |
|---|---|---|---|---|
| $\vec{n}_s=1$ | $e^{j\frac{\pi}{2}}=0+j\cdot1$ | $e^{j\frac{\pi}{2}}=0+j\cdot1$ | $e^{j\frac{\pi}{2}}=0+j\cdot1$ | $e^{j\frac{\pi}{2}}=0-j\cdot1$ |
| $\vec{n}_s=2$ | $e^{j\frac{\pi}{2}}=0+j\cdot1$ | $e^{j\frac{\pi}{2}}=0+j\cdot1$ | $e^{j\frac{\pi}{2}}=0+j\cdot1$ | $e^{j\frac{\pi}{2}}=0-j\cdot1$ |

FIG. 5

METHOD AND RADAR SYSTEM FOR REPETITION JAMMER AND CLUTTER SUPRESSION

CROSS REFERENCE TO RELATED APPLICATIONS

This application is a national stage application, filed under 35 U.S.C. §371, of International Application No. PCT/SE2010/051277, filed Nov. 19, 2010, the contents of which are hereby incorporated by reference in its entirety.

BACKGROUND

1. Related Field

The present invention relates to the field of radar systems, and more particularly, to systems and techniques for minimizing system performance degradation caused by jamming or clutter.

The present invention relates to a method and a radar system used to suppress repetition jammer signals and/or clutter signals.

2. Description of Related Art

There exist various examples of methods and systems for repetition jammer suppression and clutter suppression. Today, the known solutions for repetition jammer suppression and clutter suppression are usually based on adaption of the transmitter and/or receiver to form nulls in the antenna pattern in one or more directions corresponding to jammers and/or clutter. A weakness of using these present solutions, however, is that they require advanced control of the transmit and/or receive antenna pattern.

Further, a common way to minimize system performance degradation caused by jamming is to create deterministic and/or adaptive cancellation directions in all jammed directions. Deterministic cancellation directions are mainly used during transmit and adaptive cancellation directions mainly during receive.

These present solutions are restricted to using both expensive and heavy equipments. Further, present solutions are normally not effective enough in suppressing repetition jammer signals.

There is thus a need for an improved solution for providing an effective suppression of repetition jammer signals and/or clutter signals in order to cancel jammer and/or clutter interference.

BRIEF SUMMARY

The present invention is defined by the appended independent claims. Various examples of the invention are set forth by the appended dependent claims as well as by the following description and the accompanying drawings.

With the above description in mind, then, an aspect of the present invention is to provide an improved solution of repetition jammer suppression and/or clutter suppression which seeks to mitigate, alleviate, or eliminate one or more of the above-identified deficiencies in the art and disadvantages singly or in any combination.

The object of the present invention is to provide an inventive method and system where previously mentioned problems are partly avoided. This object is achieved by a radar system for suppressing repetition jammer signals and/or clutter signals characterized in that said radar system comprises:
at least one wideband arbitrary waveform generator, for creating arbitrary waveforms; and
at least one antenna operating with wide instantaneous bandwidth, enabling direction dependent waveform radiation;
wherein said radar system is adapted to transmit different waveforms in different directions depending on received waveforms, such that a normalised signal to noise-jammer ratio, NSNJR, is maximized, which provides that received signals from repetition jammers and/or clutter are substantially orthogonal to a received signal from a target and thereby achieving suppression of the repetition jammers and/or clutter. The present invention provides a solution which minimizes radar system performance degradation due to repetition jammer and clutter by adaptively modifying the transmitted waveforms from the radar system. The antenna may be a large antenna adapted for wideband operation. The arbitrary waveform generator used in the present invention enables the creation of arbitrary waveforms. The radar system described in the present invention is thus a radar system which is capable of suppressing repetition jammer signals and/or clutter signals.

Said object is further achieved by a method for suppressing repetition jammer signals and/or clutter signals by using a radar system characterized in that said radar system comprises: at least one wideband arbitrary waveform generator, for creating arbitrary waveforms; and at least one antenna operating with wide instantaneous bandwidth, enabling direction dependent waveform radiation;
wherein said method comprises the steps of:
transmitting different waveforms in different directions;
adapting transmitted waveforms in different directions depending on received waveforms such that a normalised signal to noise-jammer ratio, NSNJR, is maximized; and thereby
providing received signals from repetition jammers and/or clutter that are substantially orthogonal to a received signal from a target; thereby
achieving suppression of the repetition jammers and/or clutter.

According to a further advantageous aspect of the invention, said wideband arbitrary waveform generator comprises a noise generator, NG, and FIR-filters comprising FIR-filter coefficients.

According to a further advantageous aspect of the invention, said antenna is a large antenna adapted for wideband operation. Said large antenna is adapted for operation with wide instantaneous bandwidth.

According to a further advantageous aspect of the invention, said values for said FIR-filter coefficients are adapted to maximize the normalised signal to noise-jammer ratio, NSNJR.

According to a further advantageous aspect of the invention, said maximized normalised signal to noise-jammer ratio, NSNJR, is obtained after convergence of an iterative process performed for the transmit FIR-filter coefficients values, where the FIR-filter coefficients values are optimized to obtain the maximized NSNJR. Maximum NSNJR is obtained by iteratively converging and optimizing the FIR-filter coefficient values.

According to a further advantageous aspect of the invention, said maximized normalised signal to noise-jammer ratio, NSNJR, is obtained after solution of a FIR-filter coefficient equation, where the FIR-filter coefficients values are optimized to obtain the maximized NSNJR. NSNJR is obtained after solution of an equation system created by setting all partial derivatives of NSNJR as a function of all FIR-filter coefficients equal to zero.

According to a further advantageous aspect of the invention, said wideband arbitrary waveform generator comprises one noise generator connected to several FIR-filters.

According to a further advantageous aspect of the invention, said wideband arbitrary waveform generators are uncorrelated noise sources with one noise source connected to each FIR-filter.

Any of the advantageous features of the present invention above may be combined in any suitable way.

A number of advantages are provided by means of the present invention, for example:
- effective suppression of repetition jammers and/or clutter is allowed;
- no additional radar hardware development is needed to provide the improved suppression of repetition jammers and/or clutter in accordance with the present invention;
- a solution for suppression of repetition jammers and/or clutter which does not require expensive and advanced control of neither the transmit nor the receive antenna pattern is allowed;
- adaptive modification of the transmitted waveform is allowed;

BRIEF DESCRIPTION OF THE FIGURES

The present invention will now be described in detail with reference to the figures, wherein:

FIG. 5 schematically show initial FIR-filter coefficients for examples.

DETAILED DESCRIPTION OF VARIOUS EMBODIMENTS

Examples of the present invention relate, in general, to the field radar systems, in particularly, to methods and systems for deceptive transmission and suppression of jammers and/or clutter when detecting the presence and determining the direction of targets.

Examples of the present invention will be described more fully hereinafter with reference to the accompanying drawings, in which examples of the invention are shown. This invention may, however, be embodied in many different forms and should not be construed as limited to the examples set forth herein. Rather, these examples are provided so that this disclosure will be thorough and complete, and will fully convey the scope of the invention to those skilled in the art. Like reference signs refer to like elements throughout.

All the FIGS. 1 to 13 are schematically illustrated.

Figure 1:
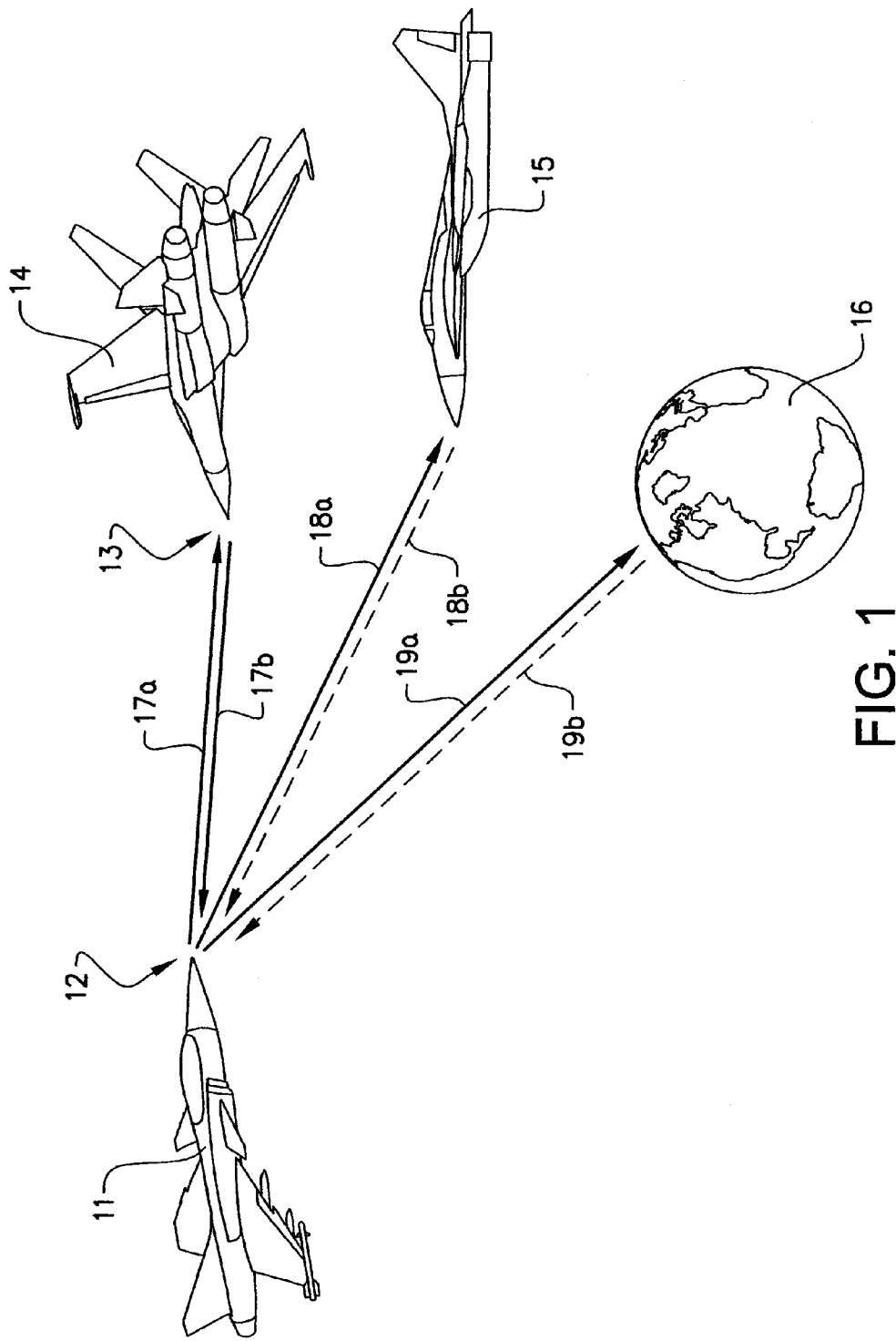
FIG. 1 schematically shows a pictorial representation of a scenario for suppression of jammers and/or clutter according to the present invention.

A scenario for suppression of jammers and/or clutter according to the present invention is schematically shown in FIG. 1. The radar system 12 in the present invention comprises an arbitrary waveform generator, such as for example a High Frequency Generator (HFG) which is able to create arbitrary waveforms and large antennas operating with wide instantaneous bandwidth which results in direction dependent waveform radiation. An arbitrary waveform generator, AWG, may generate any arbitrarily defined waveform as its output.

In communications, wideband is a relative term used to describe a wide range of frequencies in a spectrum. A system is typically described as wideband if the message bandwidth significantly exceeds the channel's coherence bandwidth. Wideband conditions are assumed to be present if the size-instantaneous bandwidth product of the antenna are approaching or exceeding the velocity of light. The antenna, used in the present invention may be a large antenna. A large antenna can be defined as an antenna not being small, where a small antenna can be defined as an antenna with a maximal physical extension considerably smaller than the ratio between the velocity of light and the instantaneous bandwidth.

The large wideband antennas operated with an instantaneous wideband waveform radiate different waveforms in different directions, as shown in FIG. 1. The present invention use this feature to ensure that the waveform radiated in the direction of localized side lobe clutter and active repetition jammers will after reception be orthogonal or close to orthogonal to the waveform received in the main beam direction from a point target, which result in suppression of jammers and/or clutter. Relating to FIG. 1, aircraft 11 comprises a radar system 12 according to the present invention. Aircraft 14 comprises a repetition jammer 13 which can actively disturb signals, contaminate and interfere in the performance of the radar system 12. The repetition jammer 13 may reduce the performance of the radar system. The radar system 12 transmit a first transmitted sidelobe waveform 17a which may be contaminated and then reflected due to a repetition jammer 13 and a first received sidelobe waveform 17b is received by the radar system 12. The transmitted main beam waveform 18a is transmitted and reflected due to the target 15 and a received main beam waveform 18b is received in the radar system 12.

Ground clutter is a factor which affects radar performance. Ground clutter is disturbance on a ground or airborne radar due to reflection of signals from the ground 16 or objects on the ground 16. Ground clutter is an unavoidable form of radar contamination. It occurs when fixed objects, such as buildings, trees or terrain obstruct the radar beam and produce non-meteorological echoes. Echoes resulting from ground clutter may cause radar systems to overestimate precipitation intensity near the radar. FIG. 1 further show, the radar system 12 transmitting a second transmitted sidelobe waveform 19a which is reflected due to ground clutter and a second received sidelobe waveform 19b which is received by the radar system 2.

The solution in the present invention calculates suitable power spectra and auto correlation functions corresponding to waveforms suitable for suppression of localized side lobe clutter and active repetition jammers. For a given signal, the power spectrum gives a plot of the portion of a signal's power (energy per unit frequency) falling within given frequency bins.

Figure 2:
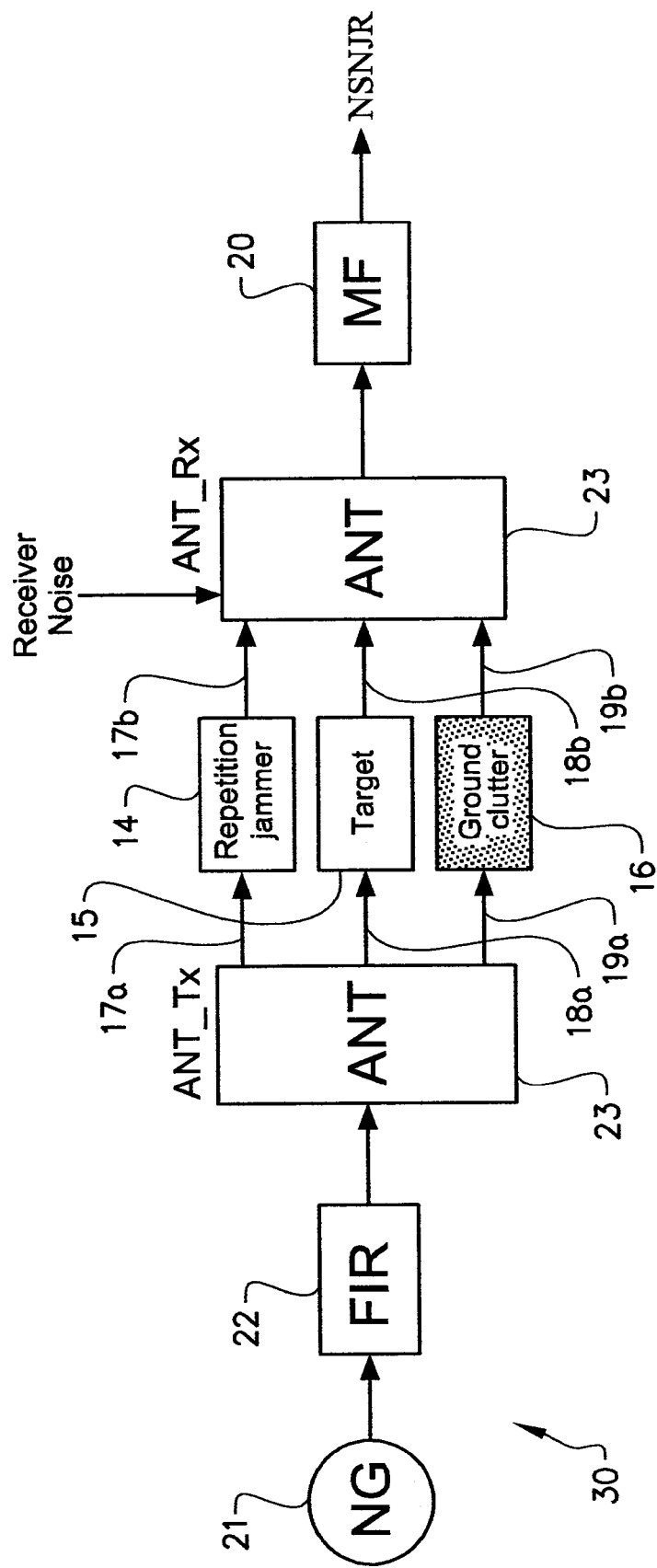
FIG. 2 schematically show a layout of a calculation model according to the present invention.

FIG. 2 schematically show a calculation model relating to how the calculations of the present invention are organized. The calculation model comprises at least one noise generator, NG, 21, at least one transmit finite impulse response, FIR, filter 22, at least one transmitting and receiving antenna 23 with sub arrays and at least one matching filter, MF, 20. The wideband arbitrary waveform generator 30 comprises for example a noise generator, NG, 21 and FIR-filters 22 comprising FIR-filter coefficients as indicated in FIG. 2. The transmitting antenna and the receiving antenna may be two separate antennas. The FIR-filter 22 shapes the waveform spectrum and comprises FIR-filter coefficients which are adaptable and programmable. Matched filters are commonly used in radar systems, in which a known signal is sent out, and the reflected signal is examined for common elements of the out-going signal. A transfer function is a mathematical representation, in terms of spatial or temporal frequency, of the relation between the input and output of a system. The transfer function of the matched filter, MF, 20 in the receiver is normally equal to the complex conjugate of the spectrum of the waveform received in the main beam direction from a point target which provides high attenuation of localized side lobe clutter and repetition jammers. The transfer function of each block in FIG. 2 is calculated and the problem is formulated as a cascade connection of filters with corresponding transfer functions. In the receiver antenna 23 is the inevitable receiver noise added. Further is the receiver noise onwards assumed to be white and Gaussian. This assumption simplifies the calculations without limiting the generality of the results, as other spectral distribution can be used if so desired. The radar system 12 comprises at least one wideband arbitrary waveform generator, and at least one antenna 23 operating with wide instantaneous bandwidth, wherein said wideband arbitrary waveform generator comprises at least one noise generator 21, NG, and at least one FIR-filter 22, but observe other constructions of the wideband arbitrary waveform generator/generators are conceivable.

The block for illustrating ground clutter 16 is dotted to indicate that it is excluded in the calculations to follow. The reason for excluding the ground clutter 16 is that the repetition jammer path is considered to be more severe than the ground clutter path as the output power from the repetition jammer 13, in contrast to the ground clutter 16, is assumed to be independent of input power. This also ensures that no suppression is achieved by forming cancellation directions in the transmit pattern. Further, there are no receiving FIR-filters in the following calculations and the reason for excluding the receive FIR-filter is to ensure that no cancellation directions are formed in the receive pattern. We have thus, by these two exclusions, refined the problem to ensure that only the waveform influences the final suppression. Normalized signal to noise-jammer ration, NSNJR, is a ratio which describes the signal noise ratio, SNR, reduction due to the jamming and is always less than unity (0 dB). NSNJR equals the following equation 2.7.7:

$$NSNJR = \frac{\frac{S}{N+J}}{\frac{S_{max}}{N}} = \frac{S}{S_{max}} \cdot \frac{1}{1+\frac{J}{N}}$$ (Equation 2.7.7)

wherein S is defined as signal power, with both jamming and clutter present and $S_{max}$ is defined as the maximum signal power, with neither jamming nor clutter present, J is defined as the combined jammer and clutter power and N is defined as the receiver noise power. There is no performance degradation caused by repetition jamming or clutter if the normalised signal to noise-jammer ratio, NSNJR, equals 0 dB.

The actual waveform is of no importance, the important functions are the Fourier transform pair formed by the waveform autocorrelation function and power spectrum. It is thus sufficient to shape the power spectrum from a "white" noise generator 21 in a transmit FIR-filter 22 as indicated in FIG. 2. The theory of the present invention is valid both for correlated and uncorrelated noise generators feeding the FIR-filter behind each antenna sub array.

In the transmit antenna there is either one noise generator (NG) connected to all FIR-filters ($\eta=0$) or independent noise generators (NG) are connected to each FIR-filter ($\eta=1$), where $\eta$ is equal to unity if $V_{\vec{n}_s}(t)$ are uncorrelated wideband white noise waveforms and zero if $V_{\vec{n}_s}(t)$ are correlated wideband white noise waveforms and where $V_{\vec{n}_s}(t)$ is the waveform connected to transmit sub array $\vec{n}_s$. The receive antenna could also be equipped with FIR-filters to further increase the suppression, but this option has not been used to ensure that no cancellation directions are formed in the receive pattern and thus will only the waveform/waveforms influence the final suppression.

Figure 3:
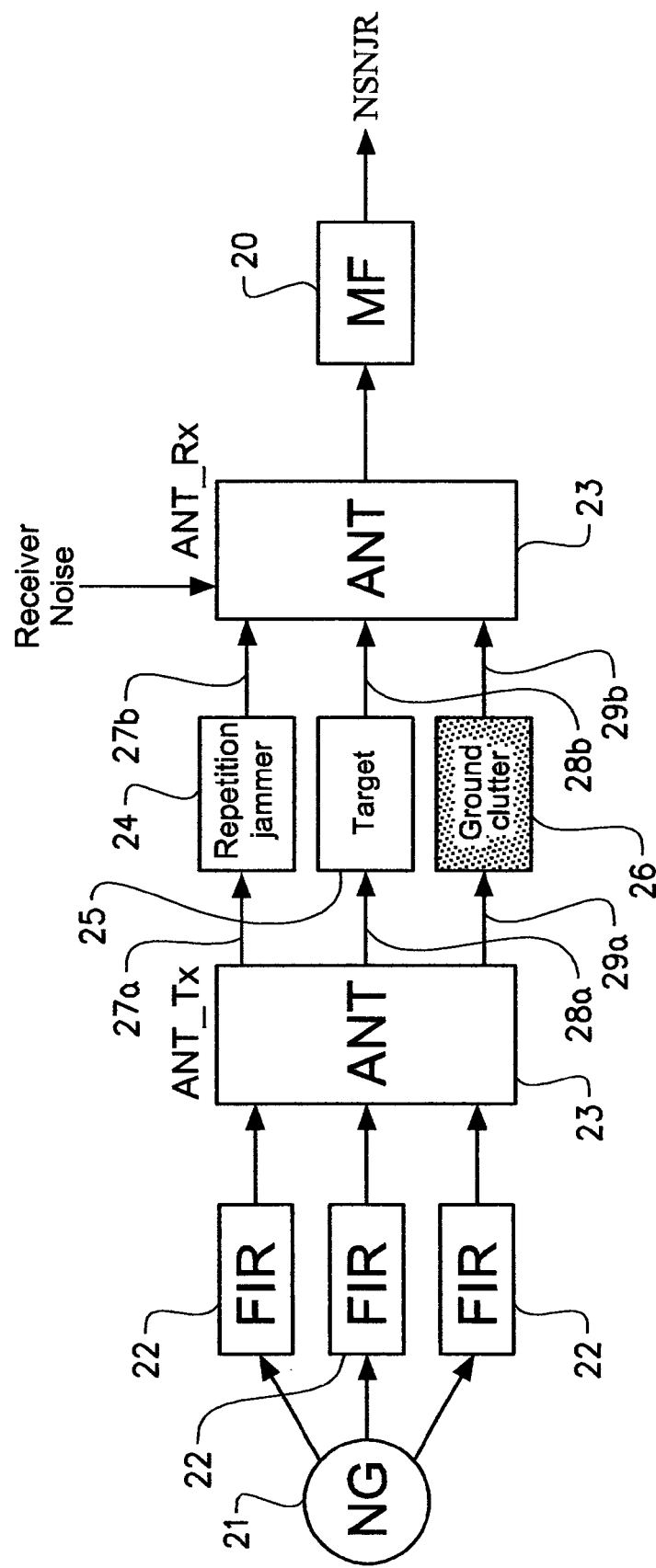
FIG. 3 schematically show a layout of a calculation model according to the present invention.

FIG. 3 schematically show a calculation model according to the present invention comprising one noise generator 21. The calculation model of the example in FIG. 3 comprises one noise generator 21 connected to several FIR-filters 22 which are connected to sub array antenna elements in the antenna 23.

Figure 4:
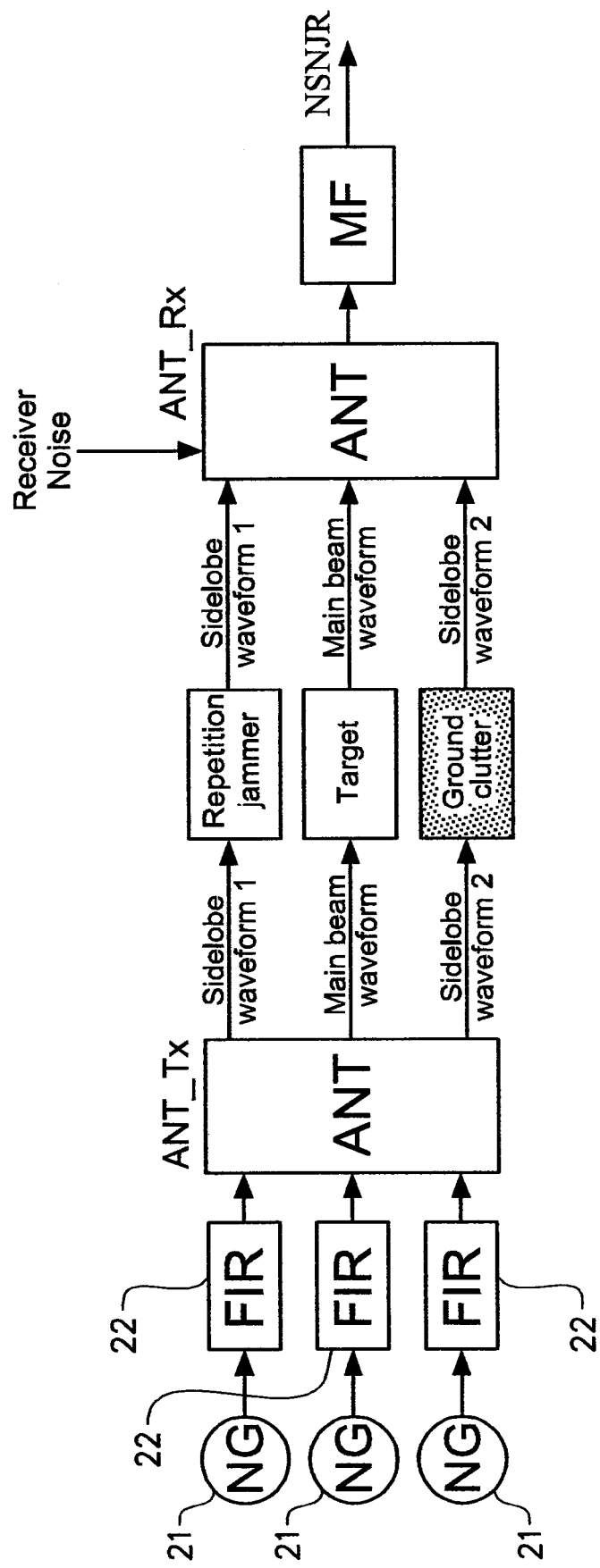
FIG. 4 schematically show a layout of a calculation model according to the present invention.

FIG. 4 schematically show a calculation model according to the present invention comprising several noise generators. The calculation model of the example in FIG. 4 comprise several different uncorrelated noise generators 21 each connected to several different FIR-filters 22 which are connected to sub array antenna elements in the antenna 23. The noise to each FIR-filter is thus uncorrelated to the noise to any other FIR-filter.

The theoretical analysis describing in detail the theory of the present invention contains the assumptions that:
- there are no errors in the array;
- mutual coupling could be ignored;
- the observation time is long enough to contain the entire waveform, range straddling losses is not included in this preliminary analysis;
- a unique waveform can be radiated from each sub array;
- element and sub array positions can be chosen arbitrarily.

Transmitted Waveform

Start with the assumption that the waveform $V_{\vec{n}_s}(t)$ is connected to transmit sub array $\vec{n}_s$. The right hand pointing arrow ($\rightarrow$) indicates transmit direction. The resulting waveform, $V_{Tx}$, including FIR filtering with $\vec{M}$ taps, after summation over all, $\vec{N}_s$, transmit sub arrays as a function of direction ($\hat{r}$) main beam direction ($\vec{r}_{MB}$), and time (t) can be calculated according to the following equation:

$$V_{Tx}(\hat{r}, \hat{r}_{MB}, t) = \sum_{\vec{n}_s=0}^{\vec{N}_s-1} \vec{h}_{\vec{n}_s}(\hat{r}, \hat{r}_{MB}, t + \vec{\tau}_{\vec{n}_s}(\hat{r}, \hat{r}_{MB})) *$$ (Equation 2.2.1)

$$\sum_{\vec{m}=0}^{\vec{M}-1} \vec{w}_{\vec{n}_s, \vec{m}} \cdot V_{\vec{n}_s}(t - \vec{m} \cdot \Delta t + \vec{\tau}_{\vec{n}_s}(\hat{r}, \hat{r}_{MB}))$$

Where:

$\vec{h}_p(\hat{r}, \hat{r}_{MB}, t)$ is the transmit sub array impulse response for transmit sub array p $\vec{\tau}_p(\hat{r},\hat{r}_{MB})$ is equal to:

$$\frac{\vec{r}_p^{sT} \cdot (\hat{r} - \hat{r}_{MB})}{c_0}$$

- • is the scalar product operator
- · is the multiplication operator
- * is the convolution operator
- $\vec{w}_{p,q}$ Is the transmit FIR-filter coefficient for transmit sub array p and transmit FIR-filter tap q
- $\vec{r}_p^{\,s}$ is the vector from the antenna origin to the phase centre of transmit sub array p
- $\hat{r}_{MB}$ is the unit vector in the main beam direction $(\theta_{MB}, \phi_{MB})$
- $\hat{r}$ is the unit vector in the observation direction $(\theta, \phi)$
- $c_o$ is the speed of light Received Waveform The transmitted waveform $V_{Tx}(\hat{r}, \hat{r}_{MB}, t)$ reaches sub array $\vec{n}_s$ with impulse response $\overleftarrow{h}_{\vec{n}_s}(\hat{r},\hat{r}_{MB},t)$. The left hand pointing arrow (←) indicating receive direction. The received waveform, $V_{Rx}$, including FIR-filtering, after summation over all, $\overleftarrow{N}_s$, receive sub arrays as a function of direction ($\hat{r}$), main beam direction ($\hat{r}_{MB}$), and time (t) can be calculated according to the following equation 2.3.1:

$$V_{Rx}(\hat{r}, \hat{r}_{MB}, t) = \sqrt{D} \cdot \quad \text{(Equation 2.3.1)}$$

$$\sum_{\overleftarrow{n}_s=0}^{\overleftarrow{N}_s-1} \sum_{\overleftarrow{m}=0}^{\overleftarrow{M}-1} \overleftarrow{w}_{\overleftarrow{n}_s\overleftarrow{m}} \cdot \overleftarrow{h}_{\overleftarrow{n}_s}(\hat{r}, \hat{r}_{MB}, t - \overleftarrow{m}\cdot\Delta t + \overleftarrow{\tau}_{\overleftarrow{n}_s}(\hat{r}, \hat{r}_{MB})) *$$

$$V_{Tx}(\hat{r}, \hat{r}_{MB}, t - \overleftarrow{m}\cdot\Delta t + \overleftarrow{\tau}_{\overleftarrow{n}_s}(\hat{r}, \hat{r}_{MB}))$$

Where:

$\overleftarrow{h}_p(\hat{r},\hat{r}_{MB},t)$ is the receive sub array impulse response for receive sub array p $\overleftarrow{\tau}_p(\hat{r},\hat{r}_{MB})$ is equal to:

$$\frac{\vec{r}_p^{sT} \cdot (\hat{r} - \hat{r}_{MB})}{c_0}$$

$\overleftarrow{w}_{p,q}$ is the receive FIR-filter coefficient for receive sub array p and receive FIR-filter tap q $\overleftarrow{r}_p^{\,s}$ is the vector from the antenna origin to the phase centre of receive sub array p D is the power attenuation between transmission and reception For a target 15 the main beam is D equal to $D_T$, as defined in the following equation 2.3.2:

$$D_T = \frac{c_0^2 \cdot \sigma_T}{16 \cdot \pi \cdot \omega_{cw}^2 \cdot r_T^4} = \frac{\sigma_T}{\pi} \cdot \left(\frac{c_0}{4 \cdot \omega_{cw} \cdot r_T^2}\right)^2 \quad \text{(Equation 2.3.2)}$$

Where:

$\sigma_T$ is the radar cross section of the target
$r_T$ is the range to the target
$\omega_{cw}$ is the angular carrier frequency of the waveform For jammer number j is D equal to $D_{J_j}$, as defined in equation 2.3.3. This definition ensures jamming with constant power independent of the power received by the jammer.

$$D_{J_j} = \frac{PG_{J_j} \cdot c_0^2}{P_{Tx}(\hat{r}_{J_j}, \hat{r}_{MB}) \cdot 4 \cdot \omega_{cw}^2 \cdot r_{J_j}^2} = \quad \text{(Equation 2.3.3)}$$

$$\frac{PG_{J_j}}{P_{Tx}(\hat{r}_{J_j}, \hat{r}_{MB})} \cdot \left(\frac{c_0}{2 \cdot \omega_{cw} \cdot r_{J_j}}\right)^2$$

Where:

$PG_{J_j}$ is the power-gain product of repetition jammer number j (equal to the jammer strength)
$P_{Tx}(\hat{r}_{J_j},\hat{r}_{MB})$ is the transmitted power in the direction of repetition jammer number j
$r_{J_j}$ is the range to repetition jammer number j
J is the number of jammers
j is the jammers counting index j∈{0 . . . (J−1)}, not to be confused with the imaginary unit Down Conversion to Baseband The next step is to split the transmit waveforms $V_{\vec{n}_s}(t)$ in one carrier part and one baseband part, $v_{\vec{n}_s}(t)$, as indicated in the following equation 2.4.1.

$$V_{\vec{n}_s}(t) = e^{-j\cdot\omega_{cw}\cdot t} \cdot v_{\vec{n}_s} \quad \text{(Equation 2.4.1)}$$

The angular carrier frequency of the waveform $\omega_{cw}$ is assumed to be equal for all transmit waveforms $V_{\vec{n}_s}(t)$. After reception is the waveform, $V_{Rx}(\hat{r},\hat{r}_{MB},t)$, down converted to baseband by multiplication with $e^{j\cdot\omega_{cw}\cdot t}$. Since the convolution operator is both commutative and associative the resulting down converted waveform, $v_{Rx}(\hat{r},\hat{r}_{MB},t)$ can be expressed as indicated in the following equation 2.4.2.

$$v_{Rx}(\hat{r}, \hat{r}_{MB}, t) = \sqrt{D} \cdot \sum_{\vec{n}_s=0}^{\vec{N}_s-1} \sum_{\overleftarrow{n}_s=0}^{\overleftarrow{N}_s-1} \sum_{\vec{m}=0}^{\vec{M}-1} \sum_{\overleftarrow{m}=0}^{\overleftarrow{M}-1} \vec{w}_{\vec{n}_s,\vec{m}} \cdot \overleftarrow{w}_{\overleftarrow{n}_s,\overleftarrow{m}} \cdot \quad \text{(Equation 2.4.2)}$$

$$e^{j\cdot\omega_{cw}\cdot\left[(\overleftarrow{m}+\vec{m})\cdot\Delta t - \vec{\tau}_{\vec{n}_s}(\hat{r},\hat{r}_{MB}) - \overleftarrow{\tau}_{\overleftarrow{n}_s}(\hat{r},\hat{r}_{MB})\right]}.$$

$$\overleftarrow{h}_{\overleftarrow{n}_s}(\hat{r},\hat{r}_{MB}, t - \overleftarrow{m}\cdot\Delta t + \overleftarrow{\tau}_{\overleftarrow{n}_s}(\hat{r},\hat{r}_{MB}) + \vec{\tau}_{\vec{n}_s}(\hat{r},\hat{r}_{MB})) *$$

$$\vec{h}_{\vec{n}_s}(\hat{r},\hat{r}_{MB}, t - \vec{m}\cdot\Delta t + \vec{\tau}_{\vec{n}_s}(\hat{r},\hat{r}_{MB})) * v_{\vec{n}_s}(t -$$

$$(\overleftarrow{m}+\vec{m})\cdot\Delta t + \vec{\tau}_{\vec{n}_s}(\hat{r},\hat{r}_{MB}) + \overleftarrow{\tau}_{\overleftarrow{n}_s}(\hat{r},\hat{r}_{MB}))$$

Matched Filtering

The matched filter is usually optimized for the waveform arriving in the main beam direction. $\tilde{\omega}_c$ is the mutual centre frequency of the transmitter and receiver. $\tilde{\omega}_B$ is the mutual bandwidth of the transmitter and receiver.

$$\tilde{\omega}_c = \frac{\max\left[\vec{\omega}_c - \frac{\vec{\omega}_B}{2}, \overleftarrow{\omega}_c - \frac{\overleftarrow{\omega}_B}{2}\right] + \min\left[\vec{\omega}_c + \frac{\vec{\omega}_B}{2}, \overleftarrow{\omega}_c + \frac{\overleftarrow{\omega}_B}{2}\right]}{2}$$

and:

$$\tilde{\omega}_B = \min\left[\vec{\omega}_c + \frac{\vec{\omega}_B}{2}, \overleftarrow{\omega}_c + \frac{\overleftarrow{\omega}_B}{2}\right] - \max\left[\vec{\omega}_c - \frac{\vec{\omega}_B}{2}, \overleftarrow{\omega}_c - \frac{\overleftarrow{\omega}_B}{2}\right]$$

The superscript * will onwards represent complex conjugation and $u_g$ [V/√rad/s] is equal to the effective value per square root of angular frequency of each waveform generator. Thus is the power density from each waveform generator, $P_g$[W/rad/s], equal to $u_g^2$. The transmit and the receive element amplitude pattern at the waveform centre frequency in the main beam direction is respectively denoted $\vec{a}_e(\hat{r}_{MB},\hat{r}_{e_{MB}},\omega_{cw})$ and $\overleftarrow{a}_e(\hat{r}_{MB},\hat{r}_{e_{MB}},\omega_{cw})$. $\hat{r}_{e_{MB}}$ is the unit vector pointing in the main beam direction of each element. Onwards will these vectors be assumed to be equal for all array elements. The effective values, $u_g$, are assumed to be equal in all waveform generators and thus also the power, $P_g$. This assumption does not restrict the validity of the theory as the magnitude of the voltage feed to each sub array can be adjusted with the magnitude of the transmit FIR-filter coefficient, $\vec{w}$.

Thus is the matched filter impulse response assumed to be equal to:

$$\frac{\sqrt{\omega_B} \cdot v^*_{Rx}(\hat{r}_{MB},\hat{r}_{MB},-t)}{\vec{N}_s \cdot u_g \cdot \sqrt{D_T} \cdot \vec{a}^*_e(\hat{r}_{MB},\hat{r}_{e_{MB}},\omega_{cw}) \cdot \overleftarrow{a}^*_e(\hat{r}_{MB},\hat{r}_{e_{MB}},\omega_{cw})} \quad \text{(Equation 2.5.0)}$$

Normalization with $$\vec{N}_s \cdot u_g \cdot \sqrt{D_T} \cdot \vec{a}^*_e(\hat{r}_{MB},\hat{r}_{e_{MB}},\omega_{cw}) \cdot \overleftarrow{a}^*_e(\hat{r}_{MB},\hat{r}_{e_{MB}},\omega_{cw})/\sqrt{\omega_B}$$

is required to make the matched filter independent of all these factors and to give it the correct dimension [rad/s]. The spectral domain transfer function of the matched filter is equal to the complex conjugate of the used waveform. Thus is the impulse response of the matched filter equal to the complex conjugate of the used waveform with time reversal. The resulting baseband waveform, $u_B(\hat{r},\hat{r}_{MB},t)$, after matched filtering can thus be calculated as indicated in the following equation 2.5.1.

$$u_B(\hat{r},\hat{r}_{MB},t) = \quad \text{(Equation 2.5.1)}$$

$$\frac{\sqrt{\omega_B} \cdot v^*_{Rx}(\hat{r}_{MB},\hat{r}_{MB},-t)}{\vec{N}_s \cdot u_g \cdot \sqrt{D_T} \cdot \vec{a}^*_e(\hat{r}_{MB},\hat{r}_{e_{MB}},\omega_{cw}) \cdot \overleftarrow{a}^*_e(\hat{r}_{MB},\hat{r}_{e_{MB}},\omega_{cw})} * v_{Rx}(\hat{r},\hat{r}_{MB},t)$$

Baseband Waveform after Matched Filtering

The baseband waveform after matched filtering is calculated by inserting equation 2.4.2 twice into equation 2.5.1. The result, after some rearrangements, is found in the following equation 2.6.1. Observe that all indexes equipped with a prime originate from the matched filter.

$$u_B(\hat{r},\hat{r}_{MB},t) = \frac{\sqrt{\omega_B \cdot D}}{\vec{N}_s \cdot u_g \cdot \vec{a}^*_e(\hat{r}_{MB},\hat{r}_{e_{MB}},\omega_{cw}) \cdot \overleftarrow{a}^*_e(\hat{r}_{MB},\hat{r}_{e_{MB}},\omega_{cw})} \quad \text{Equation (2.6.1)}$$

$$\sum_{\vec{n}'_s=0}^{\vec{N}_s-1}\sum_{\vec{n}_s=0}^{\vec{N}_s-1}\sum_{\overleftarrow{n}'_s=0}^{\overleftarrow{N}_s-1}\sum_{\overleftarrow{n}_s=0}^{\overleftarrow{N}_s-1}\sum_{\vec{m}'=0}^{\vec{M}-1}\sum_{\vec{m}=0}^{\vec{M}-1}\sum_{\overleftarrow{m}'=0}^{\overleftarrow{M}-1}\sum_{\overleftarrow{m}=0}^{\overleftarrow{M}-1} \vec{w}^*_{\vec{n}'_s,\vec{m}'} \cdot$$

$$\vec{w}_{\vec{n}_s,\vec{m}} \cdot \overleftarrow{w}^*_{\overleftarrow{n}'_s,\overleftarrow{m}'} \cdot \overleftarrow{w}_{\overleftarrow{n}_s,\overleftarrow{m}} \cdot$$

$$e^{-j\omega_{cw}\left[(\vec{m}'-\vec{m}+\overleftarrow{m}'-\overleftarrow{m})\cdot\Delta t + \vec{\tau}_{\vec{n}_s}(\hat{r},\hat{r}_{MB}) + \overleftarrow{\tau}_{\overleftarrow{n}_s}(\hat{r},\hat{r}_{MB})\right]}.$$

$$\vec{h}^*_{\vec{n}'_s}(\hat{r}_{MB},\hat{r}_{MB},-t-\vec{m}'\cdot\Delta t) * \vec{h}_{\vec{n}_s}(\hat{r},\hat{r}_{MB},t-\vec{m}\cdot\Delta t +$$

$$\vec{\tau}_{\vec{n}_s}(\hat{r},\hat{r}_{MB}) + \overleftarrow{\tau}_{\overleftarrow{n}_s}(\hat{r},\hat{r}_{MB})) *$$

$$\overleftarrow{h}^*_{\overleftarrow{n}'_s}(\hat{r}_{MB},\hat{r}_{MB},-t-\overleftarrow{m}'\cdot\Delta t) *$$

$$\overleftarrow{h}_{\overleftarrow{n}_s}(\hat{r},\hat{r}_{MB},t-\overleftarrow{m}\cdot\Delta t + \overleftarrow{\tau}_{\overleftarrow{n}_s}(\hat{r},\hat{r}_{MB})) *$$

$$v^*_{\vec{n}'_s}(-t-(\vec{m}'+\overleftarrow{m}')\cdot\Delta t) *$$

$$v_{\vec{n}_s}(t-(\vec{m}+\overleftarrow{m})\cdot\Delta t +$$

$$\vec{\tau}_{\vec{n}_s}(\hat{r},\hat{r}_{MB}) + \overleftarrow{\tau}_{\overleftarrow{n}_s}(\hat{r},\hat{r}_{MB}))$$

Remove the convolutions between all sub array impulse responses in equation 2.6.1, returning to the time domain results in equation 2.6.2.

All other new parameters in equation 2.6.2 combined with the new notation that a right hand pointing arrow (→) indicates transmit direction and that a left hand pointing arrow (←) indicating receive direction.

$$u_B(\hat{r},\hat{r}_{MB},t) = \quad \text{(Equation 2.6.2)}$$

$$\frac{\sqrt{\omega_B \cdot D}}{\vec{N}_s \cdot u_g} \cdot \vec{a}_e(\hat{r},\hat{r}_{e_{MB}},\omega_{cw}) \cdot \overleftarrow{a}_e(\hat{r},\hat{r}_{e_{MB}},\omega_{cw}) \cdot \frac{\omega_B}{2\cdot\pi} \cdot$$

$$\sum_{\vec{n}'_s=0}^{\vec{N}_s-1}\sum_{\vec{n}_s=0}^{\vec{N}_s-1}\sum_{\overleftarrow{n}'_s=0}^{\overleftarrow{N}_s-1}\sum_{\overleftarrow{n}_s=0}^{\overleftarrow{N}_s-1}\sum_{\vec{m}'=0}^{\vec{M}-1}\sum_{\vec{m}=0}^{\vec{M}-1}\sum_{\overleftarrow{m}'=0}^{\overleftarrow{M}-1}\sum_{\overleftarrow{m}=0}^{\overleftarrow{M}-1} \vec{w}^*_{\vec{n}'_s,\vec{m}'} \cdot$$

$$\vec{w}_{\vec{n}_s,\vec{m}} \cdot \overleftarrow{w}^*_{\overleftarrow{n}'_s,\overleftarrow{m}'} \cdot \overleftarrow{w}_{\overleftarrow{n}_s,\overleftarrow{m}} \cdot$$

$$e^{-j\omega_{cw}\left[(\vec{m}'-\vec{m}+\overleftarrow{m}'-\overleftarrow{m})\cdot\Delta t + \vec{\tau}_{\vec{n}_s}(\hat{r},\hat{r}_{MB}) + \overleftarrow{\tau}_{\overleftarrow{n}_s}(\hat{r},\hat{r}_{MB})\right]}.$$

$$\sum_{\vec{n}'_e=0}^{\vec{N}_e(\vec{n}'_s)-1}\sum_{\vec{n}_e=0}^{\vec{N}_e(\vec{n}_s)-1}\sum_{\overleftarrow{n}'_e=0}^{\overleftarrow{N}_e(\overleftarrow{n}'_s)-1}\sum_{\overleftarrow{n}_e=0}^{\overleftarrow{N}_e(\overleftarrow{n}_s)-1} \vec{a}^*_{\vec{n}'_e,\vec{n}'_s} \cdot \vec{a}_{\vec{n}_e,\vec{n}_s} \cdot$$

$$\overleftarrow{a}^*_{\overleftarrow{n}'_e,\overleftarrow{n}'_s} \cdot \overleftarrow{a}_{\overleftarrow{n}_e,\overleftarrow{n}_s} \cdot$$

$$e^{j\omega_{cw}\left[\vec{\tau}_{\alpha_{\vec{n}_s,\vec{n}_e}}(\hat{r}_{MB})-\vec{\tau}_{\alpha_{\vec{n}'_s,\vec{n}'_e}}(\hat{r}_{MB})+\overleftarrow{\tau}_{\alpha_{\overleftarrow{n}'_s,\overleftarrow{n}'_e}}(\hat{r}_{MB})-\overleftarrow{\tau}_{\alpha_{\overleftarrow{n}_s,\overleftarrow{n}_e}}(\hat{r}_{MB})\right]}.$$

$$\text{sinc}\left[\frac{\omega_B}{2}\cdot\left(t+2\cdot(\vec{m}'-\vec{m})\cdot\Delta t + \vec{\tau}_{\vec{n}_s}(\hat{r},\hat{r}_{MB}) + 2\cdot\overleftarrow{\tau}_{\overleftarrow{n}_s}(\hat{r},\right.\right.\right.$$

$$\hat{r}_{MB}) + \vec{\tau}_{\beta_{\vec{n}'_s,\vec{n}'_e}}(\hat{r}_{MB},\hat{r}_{MB}) -$$

$$\vec{\tau}_{\beta_{\vec{n}_s,\vec{n}_e}}(\hat{r},\hat{r}_{MB}) + \overleftarrow{\tau}_{\beta_{\overleftarrow{n}'_s,\overleftarrow{n}'_e}}(\hat{r}_{MB},$$

$$\hat{r}_{MB}) - \overleftarrow{\tau}_{\beta_{\overleftarrow{n}_s,\overleftarrow{n}_e}}(\hat{r},\hat{r}_{MB})\right] *$$

$$v^*_{\vec{n}'_s}(-t-(\vec{m}'+\overleftarrow{m}')\cdot\Delta t) *$$

$$v_{\vec{n}_s}(t-(\vec{m}+\overleftarrow{m})\cdot\Delta t +$$

$$\vec{\tau}_{\vec{n}_s}(\hat{r},\hat{r}_{MB}) + \overleftarrow{\tau}_{\overleftarrow{n}_s}(\hat{r},\hat{r}_{MB}))$$

If we further assume a perfect point target and ideal repetition jammers combined with a perfect matched filter the equality in equation 2.6.3 is true.

$$v^*_{\vec{n}'_s}(-t-(\vec{m}'+\overleftarrow{m}')\cdot\Delta t) * \quad \text{(Equation 2.6.3)}$$

$$v_{\vec{n}_s}(t-(\vec{m}+\overleftarrow{m})\cdot\Delta t + \vec{\tau}_{\vec{n}_s}(\hat{r},\hat{r}_{MB}) + \overleftarrow{\tau}_{\overleftarrow{n}_s}(\hat{r},\hat{r}_{MB})) =$$

-continued $$v^*_{\vec{n}'_s} \odot v_{\vec{n}_s}(t + (\vec{m}' - \vec{m} + \vec{m}' - \vec{m}) \cdot \Delta t +$$

$$\vec{\tau}_{\vec{n}_s}(\hat{r}, \hat{r}_{MB}) + \vec{\tau}_{\vec{n}_s}(\hat{r}, \hat{r}_{MB}))$$

Where $\odot$ is the correlation operator, defined as:

$$g^* \odot h(t) = \int_{-\infty}^{\infty} g^*(\tau - t) \cdot h(\tau) \cdot d\tau = \int_{-\infty}^{\infty} g^*(\tau) \cdot h(\tau + t) \cdot d\tau$$

For the two special, but very important, cases when all the waveforms $V_{\vec{n}_s}(t)$ are correlated or uncorrelated wideband white noise equation 2.6.3 could be further simplified as indicated in equation 2.6.4 for the case with correlated wideband white noise, and as indicated in equation 2.6.5 for the case with uncorrelated wideband white noise. Only these two examples are treated in the analysis to follow.

$$v^*_{\vec{n}'_s}(-t - (\vec{m}' + \vec{m}') \cdot \Delta t) *$$ (Equation 2.6.4)

$$v_{\vec{n}_s}(t - (\vec{m} + \vec{m}) \cdot \Delta t + \vec{\tau}_{\vec{n}_s}(\hat{r}, \hat{r}_{MB}) + \vec{\tau}_{\vec{n}_s}(\hat{r}, \hat{r}_{MB})) =$$

$$u_g^2 \cdot \delta(t + (\vec{m}' - \vec{m} + \vec{m}' - \vec{m}) \cdot \Delta t +$$

$$\vec{\tau}_{\vec{n}_s}(\hat{r}, \hat{r}_{MB}) + \vec{\tau}_{\vec{n}_s}(\hat{r}, \hat{r}_{MB}))$$

$$v^*_{\vec{n}'_s}(-t - (\vec{m}' + \vec{m}') \cdot \Delta t) *$$ (Equation 2.6.5)

$$v_{\vec{n}_s}(t - (\vec{m} + \vec{m}) \cdot \Delta t + \vec{\tau}_{\vec{n}_s}(\hat{r}, \hat{r}_{MB}) + \vec{\tau}_{\vec{n}_s}(\hat{r}, \hat{r}_{MB})) =$$

$$u_g^2 \cdot \delta_{\vec{n}'_s, \vec{n}_s} \cdot \delta(t + (\vec{m}' - \vec{m} + \vec{m}' - \vec{m}) \cdot \Delta t +$$

$$\vec{\tau}_{\vec{n}_s}(\hat{r}, \hat{r}_{MB}) + \vec{\tau}_{\vec{n}_s}(\hat{r}, \hat{r}_{MB}))$$

In equation 2.6.4 and 2.6.5 are $$\delta_{\vec{n}'_s, \vec{n}_s}$$

equal to the Kronecker delta function and $\delta(t)$ equal to the Dirac delta function introduced. Observe that the transmitter bandwidth is determined by the transmit sub array impulse response, $\vec{h}_{\vec{n}_s}(\hat{r}, \hat{r}_{MB}, t)$, and that the waveform characteristics is determined by the transmit FIR-filter coefficients, $\vec{w}_{\vec{n}_s, \vec{m}}$, for each transmit sub array, in the special but very important cases, when equation 2.6.4 or equation 2.6.5 is valid. We are now in a position where we can calculate the received baseband waveform after matched filtering for the special cases when the waveforms $V_{\vec{n}_s}(t)$ are correlated or uncorrelated wideband white noise. The result is given in equation 2.6.6.

$$u_B(\hat{r}, \hat{r}_{MB}, t) =$$ (Equation 2.6.6)

$$\frac{u_g \cdot \sqrt{\bar{\omega}_B \cdot D}}{2 \cdot \pi \cdot \vec{N}_s} \cdot \vec{a}_e(\hat{r}, \hat{r}_{e_{MB}}, \omega_{cw}) \cdot \vec{a}_e(\hat{r}, \hat{r}_{e_{MB}}, \omega_{cw}) \cdot$$

$$\sum_{\vec{n}'_s=0}^{\vec{N}_s-1} \sum_{\vec{n}_s=0}^{\vec{N}_s-1} \sum_{\vec{n}'_s=0}^{\vec{N}_s-1} \sum_{\vec{n}_s=0}^{\vec{N}_s-1} \sum_{\vec{m}'=0}^{\vec{M}-1} \sum_{\vec{m}=0}^{\vec{M}-1} \sum_{\vec{m}=0}^{\vec{M}-1} \vec{w}^*_{\vec{n}'_s, \vec{m}'} \cdot \vec{w}_{\vec{n}_s, \vec{m}} \cdot$$

$$\vec{w}^*_{\vec{n}'_s, \vec{m}'} \cdot \vec{w}_{\vec{n}_s, \vec{m}} \cdot \begin{Bmatrix} 1 & \text{if } \eta = 0 \\ \delta_{\vec{n}'_s, \vec{n}_s} & \text{if } \eta = 1 \end{Bmatrix}.$$

-continued $$e^{-j \cdot \omega_{cw} \cdot [(\vec{m}' - \vec{m} + \vec{m}' - \vec{m}) \cdot \Delta t + \vec{\tau}_{\vec{n}_s}(\hat{r}, \hat{r}_{MB}) + \vec{\tau}_{\vec{n}_s}(\hat{r}, \hat{r}_{MB})]}.$$

$$\sum_{\vec{n}'_e=0}^{\vec{N}_e(\vec{n}'_s)-1} \sum_{\vec{n}_e=0}^{\vec{N}_e(\vec{n}_s)-1} \sum_{\vec{n}'_e=0}^{\vec{N}_e(\vec{n}'_s)-1} \sum_{\vec{n}_e=0}^{\vec{N}_e(\vec{n}_s)-1} \vec{a}^*_{\vec{n}'_e, \vec{n}'_s} \cdot \vec{a}_{\vec{n}_e, \vec{n}_s} \cdot$$

$$\vec{a}^*_{\vec{n}'_e, \vec{n}'_s} \cdot \vec{a}_{\vec{n}_e, \vec{n}_s} \cdot$$

$$e^{j \cdot \omega_{cw} \cdot [\vec{\tau}_{\alpha_{\vec{n}'_s, \vec{n}'_e}}(\hat{r}_{MB}) - \vec{\tau}_{\alpha_{\vec{n}_s, \vec{n}_e}}(\hat{r}_{MB}) + \vec{\tau}_{\alpha_{\vec{n}'_s, \vec{n}'_e}}(\hat{r}_{MB}) - \vec{\tau}_{\alpha_{\vec{n}_s, \vec{n}_e}}(\hat{r}_{MB})]}.$$

$$\text{sinc}\left[\frac{\bar{\omega}_B}{2} \cdot (t + ((\vec{m}' - \vec{m}) + 3 \cdot (\vec{m}' - \vec{m})) \cdot \Delta t + 2 \cdot \right.$$

$$\vec{\tau}_{\vec{n}_s}(\hat{r}, \hat{r}_{MB}) + 3 \cdot \vec{\tau}_{\vec{n}_s}(\hat{r}, \hat{r}_{MB}) +$$

$$\vec{\tau}_{\beta_{\vec{n}'_s, \vec{n}'_e}}(\hat{r}_{MB}, \hat{r}_{MB}) -$$

$$\vec{\tau}_{\beta_{\vec{n}_s, \vec{n}_e}}(\hat{r}, \hat{r}_{MB}) + \vec{\tau}_{\beta_{\vec{n}'_s, \vec{n}'_e}}(\hat{r}_{MB},$$

$$\left. \hat{r}_{MB}) - \vec{\tau}_{\beta_{\vec{n}_s, \vec{n}_e}}(\hat{r}, \hat{r}_{MB}) \right]$$

Where $\eta=0$ if $V_{\vec{n}_s}(t)$ are correlated wideband white noise waveforms and $\eta=1$ if $V_{\vec{n}_s}(t)$ are uncorrelated wideband white noise waveforms. It should be observed that there is effectively one summation less on the second row in equation 2.6.6 if $\eta=1$, due to the $$\delta_{\vec{n}'_s, \vec{n}_s}$$

factor. The influence of the $$\delta_{\vec{n}'_s, \vec{n}_s}$$

factor could be accounted for by removing the summation over $\vec{n}'_s$ and replacing $\vec{n}'_s$ with $\vec{n}_s$ in the remaining part of the equation.

Normalised Signal to Noise-Jammer Ratio

The signal power can be estimated as the expected value, of $|u_B(\hat{r}_{MB}, \hat{r}_{MB}, t)|^2$, since $u_B(\hat{r}_{MB}, \hat{r}_{MB}, t)$ is an effective value, as indicated in equation 2.7.1.

$$S = E[|u_B(\hat{r}_{MB}, \hat{r}_{MB}, t)|^2] = E[u^*_B(\hat{r}_{MB}, \hat{r}_{MB}, t) \cdot u_B(\hat{r}_{MB}, \hat{r}_{MB}, t)]$$ (Equation 2.7.1)

Where $E[f(x)]$ is the expected value of $f(x)$. The final expression for the signal power, found in equation 2.7.2, is obtained by inserting equation 2.6.6 twice into equation 2.7.1. Observe that all indexes equipped with a back prime originate from the complex conjugated factor in all power calculations.

$\overrightarrow{EP}(\hat{r}_{MB}, \hat{r}_{e_{MB}}, \omega_{cw})$ and $\overleftarrow{EP}(\hat{r}_{MB}, \hat{r}_{e_{MB}}, \omega_{cw})$ is respectively the transmit and receive element power pattern. Since equation 2.7.2 is an extensive equation it is found at the end of this document under Equations.

If $\eta=1$ could the influence of the $$\delta_{\vec{n}'_s, \vec{n}_s} \cdot \delta_{\vec{n}'_s, \vec{n}_s}$$

factor be accounted for by removing the summations over '$\vec{n}'_s$ and $\vec{n}'_s$ and replacing '$\vec{n}'_s$ with '$\vec{n}_s$ and $\vec{n}'_s$ with $\vec{n}_s$ in the remaining part of the equation. The jammer power, J, not to be confused with the total number of jammers, can be estimated in a similar way, as the signal power, with equation 2.7.3.

$$J = \sum_{j=0}^{J-1} E[|u_B(\hat{r}_{Jj}, \hat{r}_{MB}, t)|^2] = \sum_{j=0}^{J-1} E[u_B^*(\hat{r}_{Jj}, \hat{r}_{MB}, t) \cdot u_B(\hat{r}_{Jj}, \hat{r}_{MB}, t)]$$ (Equation 2.7.3)

The final expression for the jammer power, found in equation 2.7.4, is obtained by inserting equation 2.6.6 twice into equation 2.7.3. Since equation 2.7.4 is an extensive equation it is found at the end of this document under Equations.

The receiver noise power can, be estimated with equation 2.7.5, since $v_{Rx}(\hat{r}_{mB},\hat{r}_{MB},t)$ is an effective value. Since equation 2.7.5 is an extensive equation it is found at the end of this document under Equations.

Where $\upsilon_{p,q}(t)$ is the noise voltage in element number p in sub array number q. It is further assumed that the noise powers in all antenna elements are uncorrelated with equal power density, onwards denoted as $N_0$ [W/rad/s] ($N_0$=k·T/(2·π)). Where k and T respectively is equal to Boltzmanns constant and the equivalent noise temperature of each antenna element. The final expression for the receiver noise power, found in equation 2.7.6, is obtained by inserting equation 2.4.2 twice into equation 2.7.5. Since equation 2.7.6 is an extensive equation it is found at the end of this document under Equations.

The influence of the $$\delta_{\vec{n}_s',\vec{n}_s}$$

factor could be accounted for by removing the summation over $\vec{n}_s$ and replacing $\vec{n}_s'$ with $\vec{n}_s$ in the remaining part of the equation. The $$\delta_{\vec{n}_e,\vec{n}_e}$$

factor could be accounted for in an analogous manner.

Next we introduce the "Normalised Signal to Noise-Jammer Ratio", NSNJR defined according to equation 2.7.7. This ratio describes the SNR (Signal Noise Ration) reduction due to the jamming and is always less than unity (0 dB).

$$NSNJR = \frac{\frac{S}{N+J}}{\frac{S_{max}}{N}} = \frac{S}{S_{max}} \cdot \frac{1}{1+\frac{J}{N}}$$ (Equation 2.7.7)

In equation (2.7.7) is $S_{max}$ defined as the maximum signal power. The maximum signal power is obtained when $\{\vec{\alpha}\}=\vec{\alpha}=0$, $\{\vec{\beta}\}=\vec{\beta}=\{\vec{\gamma}\}=\vec{\gamma}=1$, see the section below titled nomenclature. $S_{max}$ can be expressed as indicated in equation 2.7.8. Since equation 2.7.8 is an extensive equation it is found at the end of this document under Equations.

Transmitted Power

The transmitted power in the $\hat{r}$ direction, $P_{Tx}(\hat{r},\hat{r}_{MB})$, can be calculated with equation 2.8.1, since $V_{Tx}(\hat{r},\hat{r}_{MB},t)$ is an effective value.

$$P_{Tx}(\hat{r},\hat{r}_{MB}) = E[|V_{Tx}(\hat{r},\hat{r}_{MB},t)|^2] = E[V^*_{Tx}(\hat{r},\hat{r}_{MB},t) \cdot V_{Tx}(\hat{r},\hat{r}_{MB},t)]$$ (Equation 2.8.1)

The final expression for the transmitted power in the $\hat{r}$ direction, $P_{Tx}(\hat{r},\hat{r}_{MB})$, is found equation 2.8.2. Since equation 2.8.2 is an extensive equation it is found at the end of this document under Equations. Equation 2.8.2 can be used in equation 2.3.3 to calculate $P_{Tx}(\hat{r}_{Jj},\hat{r}_{MB})$, it can also be used to calculate the wideband transmit antenna pattern as well as the main beam power for a given set of transmit FIR-filter coefficients.

And finally, equation 2.7.2, 2.7.8, 2.7.4, and 2.7.6 can be inserted into equation 2.7.7 for calculation of NSNJR. The values of the $\vec{w}$-matrix and the $\vec{\tilde{w}}$-matrix that maximizes the NSNJR are to prefer. The $\vec{w}$-matrix shapes the transmit waveform and the $\vec{\tilde{w}}$-matrix shapes the receive antenna pattern.

Auto Correlation Function of the Transmitted Waveform in the Main Beam Direction The auto correlation function of the transmitted waveform in the main beam direction, $R_{Tx}(t)$, determines the range resolution. This important function can be calculated in a way similar to equation 2.8.2, the result is found in equation 2.9.1. Since equation 2.9.1 is an extensive equation it is found at the end of this document under Equations.

Transmitted Power Spectrum in the Main Beam Direction

The resulting transmitted power spectrum in the main beam direction, $S_{Tx}(\omega)$, is equal to the Fourier transform of the auto correlation function of the transmitted waveform in the main beam direction, $R_{Tx}(\tau)$. It is thus possible to calculate the resulting transmitted power spectrum in the main beam direction by Fourier transformation of equation 2.9.1, the result is found in equation 2.10.1.

Examples of the Present Invention

Examples of the theory previously described will now follow.

Assumptions and input values

Uniform linear array antenna geometry, common for both transmit and receive

Three equal linear sub arrays ($\vec{N}_s = \vec{\tilde{N}}_s = N_s = 3$) equipped with five antenna elements each ($\forall \vec{N}_e(\vec{n}_s) = \forall \vec{\tilde{N}}_e(\vec{\tilde{n}}_s) = N_e = 5$)
Element separation: d=14.276 mm
Element data, common for both transmit and receive
Element main beam direction: $\hat{r}_{e_{MB}} = \hat{z} = (0\ 0\ 1)$
Element power pattern:

$$\vec{EP}(\hat{r},\hat{r}_{e_{MB}},\omega_{cw}) = \overline{EP}(\hat{r},\hat{r}_{e_{MB}},\omega_{cw}) \approx \hat{r}^T \cdot \hat{z} = \cos(\theta)$$

Uniform element excitation:

$$\forall \vec{a} = \forall \vec{\tilde{a}} = \frac{1}{N_e}$$

Array antenna control, common for both transmit and receive
Main beam azimuth angle: $Az_{MB}=30°$
Main beam elevation angle: $El_{MB}=0°$
Resulting main beam unit vector: $\hat{r}_{MB}=[0,500\ 0,000\ 0,866]^T$
TTD-control of each element in each sub array: γ=1

TTD-control of each sub array in the array antenna: α=0, β=1
Transmit FIR-filter
  Number taps: $\vec{M}=4$
  Delay between FIR-filter taps: Δt=1 ns
Receive FIR-filter
  Number taps: $\tilde{M}=1$, $\forall \tilde{w}=1$
Transmitter and receiver
  Centre angular frequency: $\vec{\omega}_c = \overleftarrow{\omega}_c = \ddot{\omega}_c = \omega_c = 2\cdot\pi\cdot 9.0$ GHz
  Bandwidth: $\vec{\omega}_B = \overleftarrow{\omega}_B = \ddot{\omega}_B = \omega_B = 2\cdot\pi\cdot 1.0$ GHz
Waveform
  White bandwidth limited Gaussian noise
    Correlated (η=0) between transmit sub arrays
    Uncorrelated (η=1) between transmit sub arrays
  Centre angular frequency: $\omega_{cw} = \omega_c = 2\cdot\pi\cdot 9.0$ GHz
  Bandwidth: $\omega_{Bw} = \omega_B = 2\cdot\pi\cdot 1.0$ GHz
Jammer data
  Number of jammers: J=1
  Jammer number 1
    Repetition jamming
    Jammer power normalised to the equivalent receiver noise level in the antenna element:

$$NJP_1 = \frac{PG_{J1}}{N_0 \cdot \omega_B} \cdot \left(\frac{c_0}{2\cdot \omega_{cw} \cdot r_{J1}}\right)^2 = 20 \text{ dB}$$

Azimuth angle: $Az_{J1} = -45.0°$
    Elevation angle: $El_{J1} = 0.0°$
      Resulting unit vector: $\hat{r}_{J1} = [-0.707\ 0.000\ 0.707]^T$
      (Observe the index in all equations; Jammer number 1 has index number 0, and so on)

With these assumptions and input values we can make these observations:
S=$S_{max}$
$\omega_c \cdot \Delta t = 2\cdot\pi\cdot$int (Where int is an integer value)
$\omega_B \cdot \Delta t = 2\cdot\pi$ Based on these observations following simplifications are possible:
Equation 2.8.2, transmitted power, $P_{Tx}$ result in equation 3.2.1. Since equation 3.2.1 is an extensive equation it is found at the end of this document under Equations.
Equation 2.7.2, received signal power, S result in equation 3.2.2. Since equation 3.2.2 is an extensive equation it is found at the end of this document under Equations.
Equation 2.7.6, received noise power, N:

$$N = \frac{N_0 \cdot \omega_B \cdot N_s}{N_e} \cdot \sum_{\vec{n}_s'=0}^{N_s-1} \sum_{\vec{n}_s'=0}^{N_s-1} \sum_{\vec{m}'=0}^{\vec{M}-1} \sum_{\vec{m}'=0}^{\vec{M}-1} \vec{w}_{\vec{n}_s',\vec{m}'} \cdot \vec{w}_{\vec{n}_s',\vec{m}'}^*$$ (Equation 3.2.3)

Equation 2.7.4, received jammer power, J, result in equation 3.2.4. Since equation 3.2.4 is an extensive equation it is found at the end of this document under Equations.
Equation 2.7.7, "Normalised Signal to Noise-Jammer Ratio", NSNJR:

$$NSNJR = \frac{1}{1 + \frac{J}{N}}$$ (Equation 3.2.5)

Equation 2.9.1, radar range resolution, $R_{Tx}(\tau)$, result in equation 3.2.6. Since equation 3.2.6 is an extensive equation it is found at the end of this document under Equations.
Equation 2.10.1, transmitted power spectrum in the main beam direction, $P_{Tx}(\omega)$ result in equation 3.2.7. Since equation 3.2.7 is an extensive equation it is found at the end of this document under Equations.

If equation 3.2.4 and 3.2.3 are inserted into equation 3.2.5 and usage is made of equation 2.3.3 together with equation 3.2.1 it is possible to formulate the final expression for the "Normalised Signal to Noise-Jammer Ratio", The result is found in equation 3.2.8. Since equation 3.2.8 is an extensive equation it is found at the end of this document under Equations.

The remaining problem is to find the transmit FIR-filter coefficients, $\vec{w}$, that maximises NSNJR. This will be done by a numerical search. Observe that $\Lambda_{\vec{n}_s',\vec{n}_s,\vec{n}_s',\vec{n}_s}(\eta)$, $\Lambda'_{\vec{n}_s',\vec{n}_s}(\eta)$, $\Psi_{\vec{n}_s,\vec{n}_s,\vec{n}_s,\vec{n}_s,j}(\hat{r}_{MB})$, $\overleftrightarrow{\psi}_{\vec{m}',\vec{m},\vec{m}',\vec{m},\vec{n}_s',\vec{n}_s,\vec{n}_s',\vec{n}_s',\vec{n}_s,\vec{n}_s',\vec{n}_s,j}(\hat{r}_{MB})$, $A_{\vec{m}',\vec{m},\vec{m}',\vec{m}}$, $B_{\vec{n}_s,\vec{n}_s,\vec{n}_s,\vec{n}_s,\vec{n}_e,\vec{n}_e,\vec{n}_e,\vec{n}_e,j}(\hat{r}_{MB})$, and $\Gamma_{\vec{n}_s',\vec{n}_s,\vec{n}_s',\vec{n}_s,\vec{n}_s',\vec{n}_s,\vec{n}_s',\vec{n}_s}(\hat{r}_{MB})$ theoretically all could be calculated prior to the numerical search, to reduce the computation time, since they all are independent of $\vec{\omega}$. However in the practical implementation on a standard PC the working memory is not sufficient to hold for instance $\overleftrightarrow{\psi}_{\vec{m}',\vec{m},\vec{m}',\vec{m},\vec{n}_s',\vec{n}_s,\vec{n}_s',\vec{n}_s,\vec{n}_s',\vec{n}_s,\vec{n}_s',\vec{n}_s,j}(\hat{r}_{MB})$.

The amount of calculations prior to the numerical search has to be matched against the available amount working memory on the computer used for the calculations.

Results for Examples of the Present Invention

An iterative search is performed for the transmit FIR-filter coefficient, $\vec{w}_{p,q}$, minimizing the "Normalised Signal to Noise-Jammer Ratio", NSNJR. Initial values according to FIG. 5 is used, both for an example with correlated white bandwidth limited Gaussian noise and for an example with uncorrelated white bandwidth limited Gaussian noise, in analogy with a fourth order Barker code.

Figure 6:
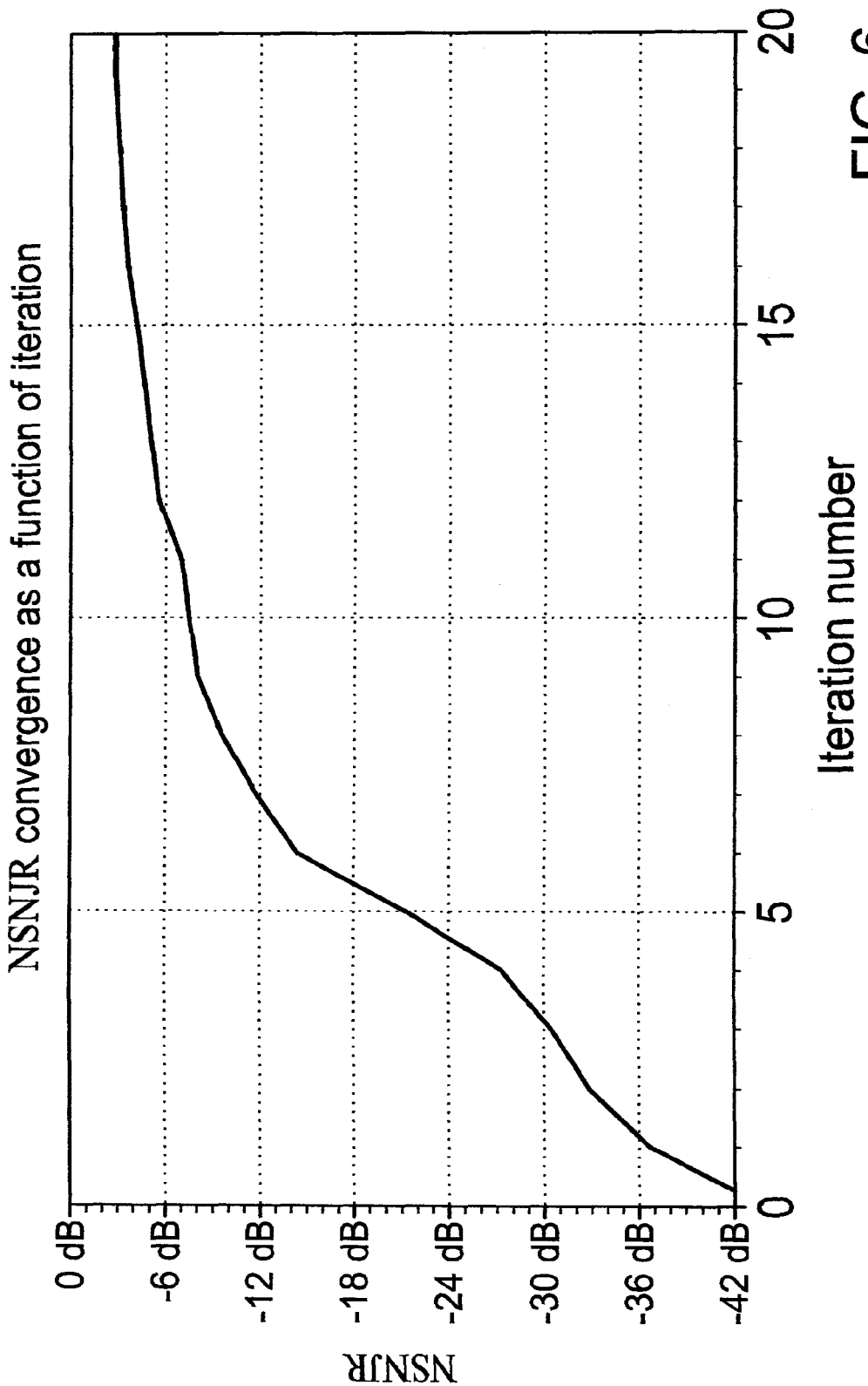
FIG. 6 schematically show NSNJR convergence as a function of iteration with correlated sources.

An example is for the correlated white bandwidth limited Gaussian noise, where the convergence of the iterative process is schematically illustrated in FIG. 6. This example comprises one noise generator connected to several FIR-filters which are connected to sub array antenna elements. FIG. 6 schematically illustrate the minimizing of NSNJR in relation to the number of iterations.

Figure 7:
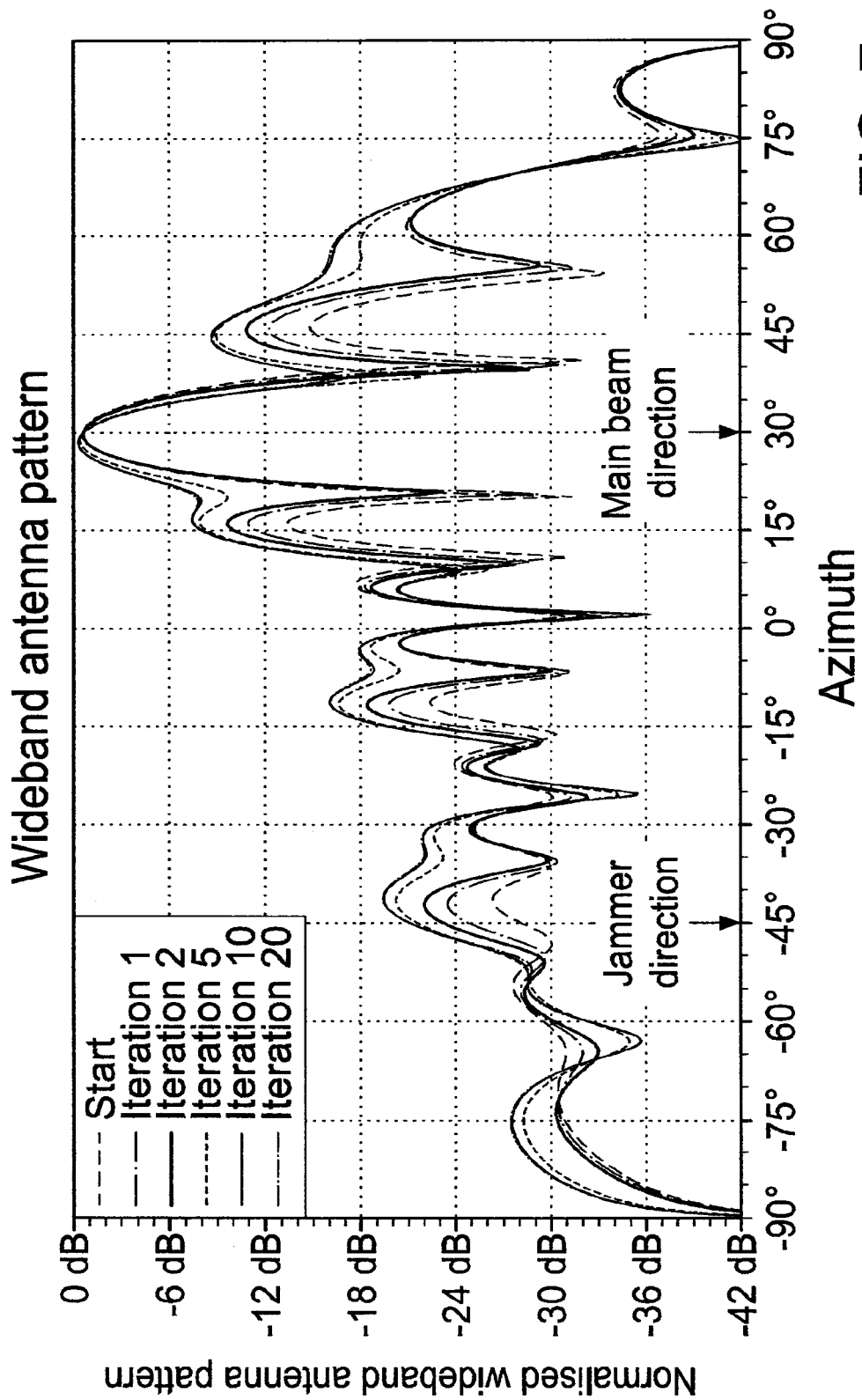
FIG. 7 schematically show wideband antenna pattern with correlated sources.
Figure 8:
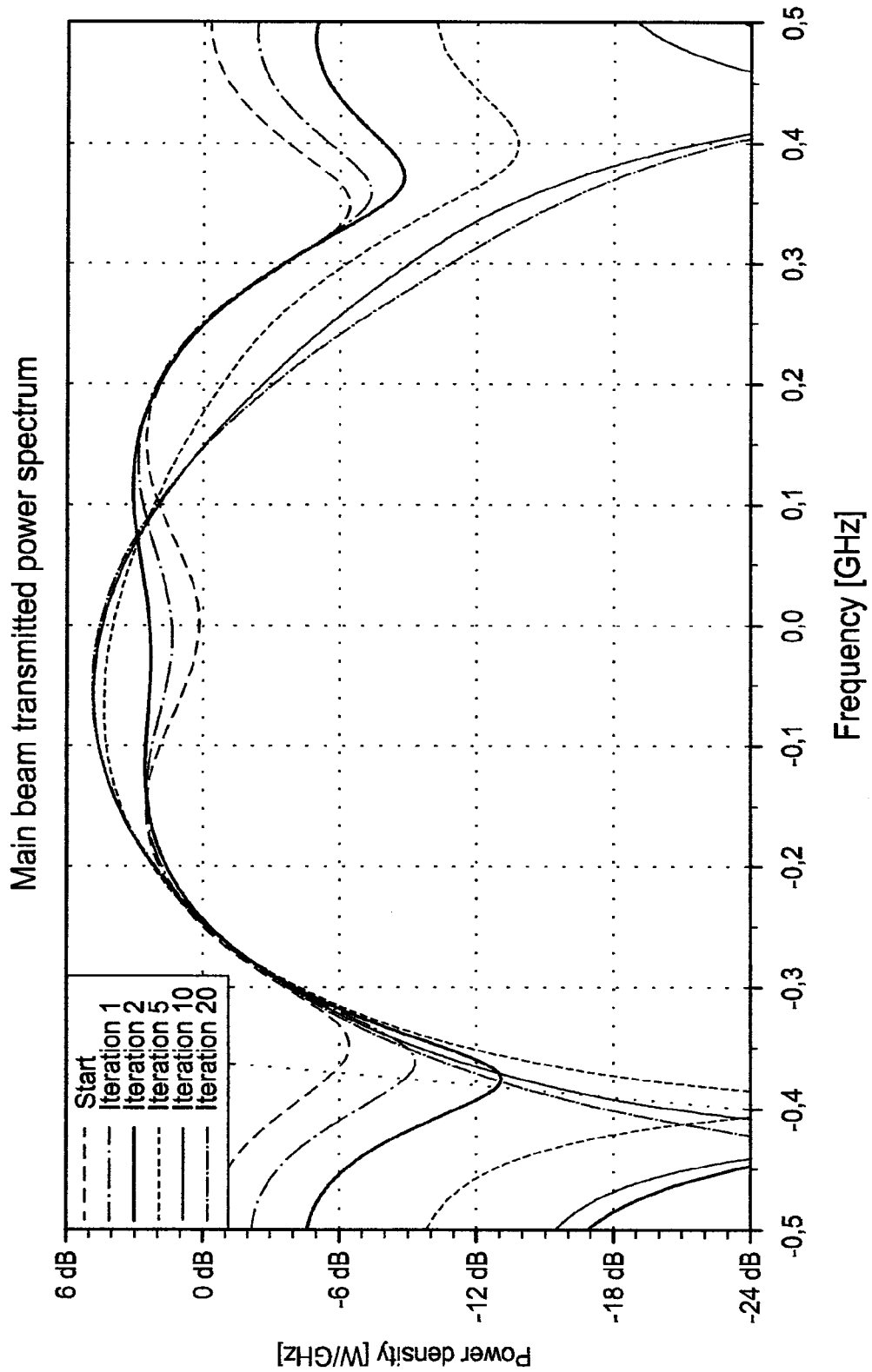
FIG. 8 schematically show main beam transmitted power spectrum with correlated sources.
Figure 9:
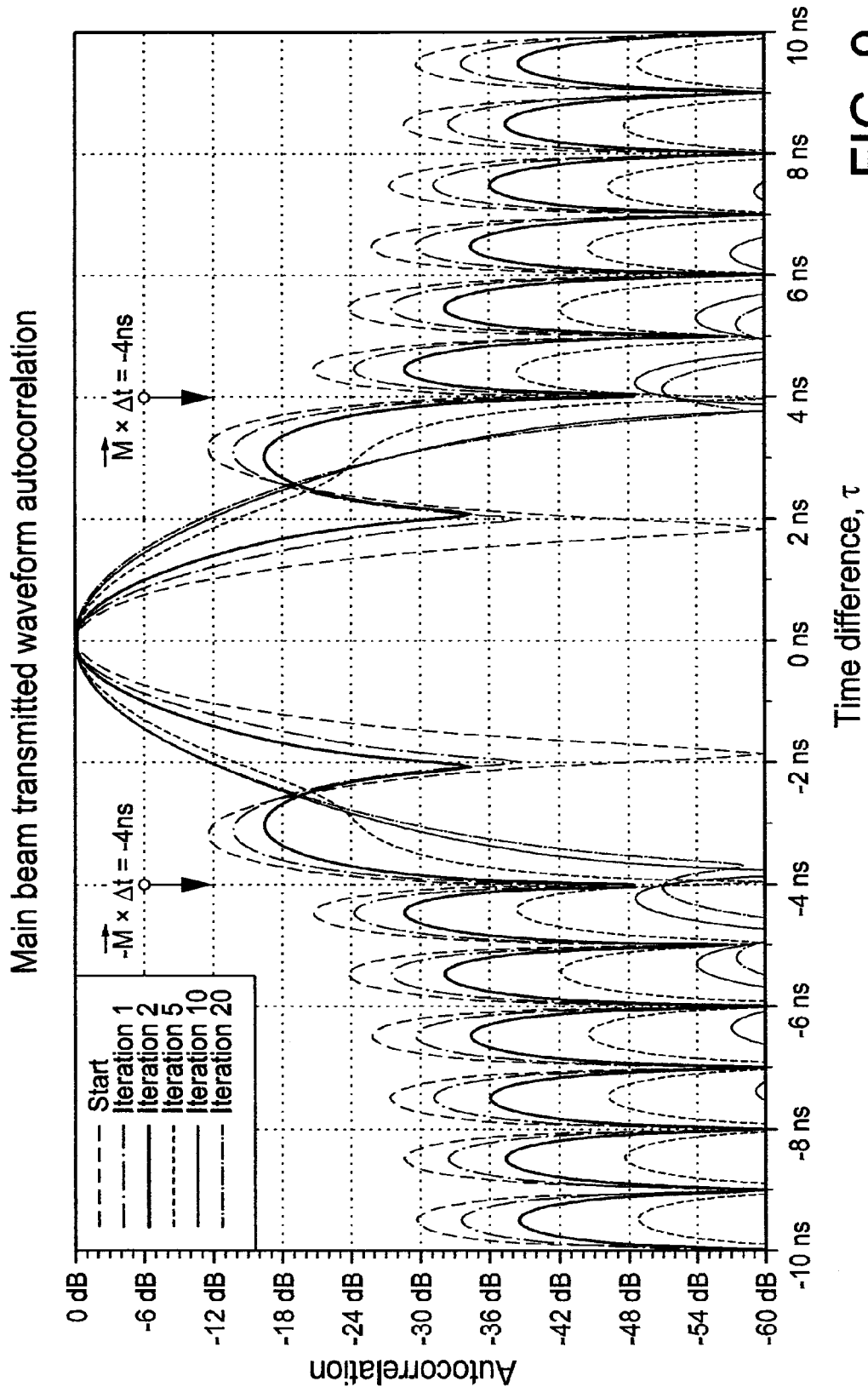
FIG. 9 schematically show main beam transmitted waveform autocorrelation function with correlated sources.

The wideband antenna pattern, the transmitted power spectrum in the main beam direction, and the autocorrelation function of the waveform transmitted in the main beam direction are plotted in FIG. 7, FIG. 8, and FIG. 9 respectively for the transmit FIR-filter coefficients obtained after one, two, five, ten, and twenty iterations. In FIG. 8 and FIG. 9, the Fourier transform pair formed by the power spectrum and the autocorrelation function in the main bean direction is visualized.

Figure 10:
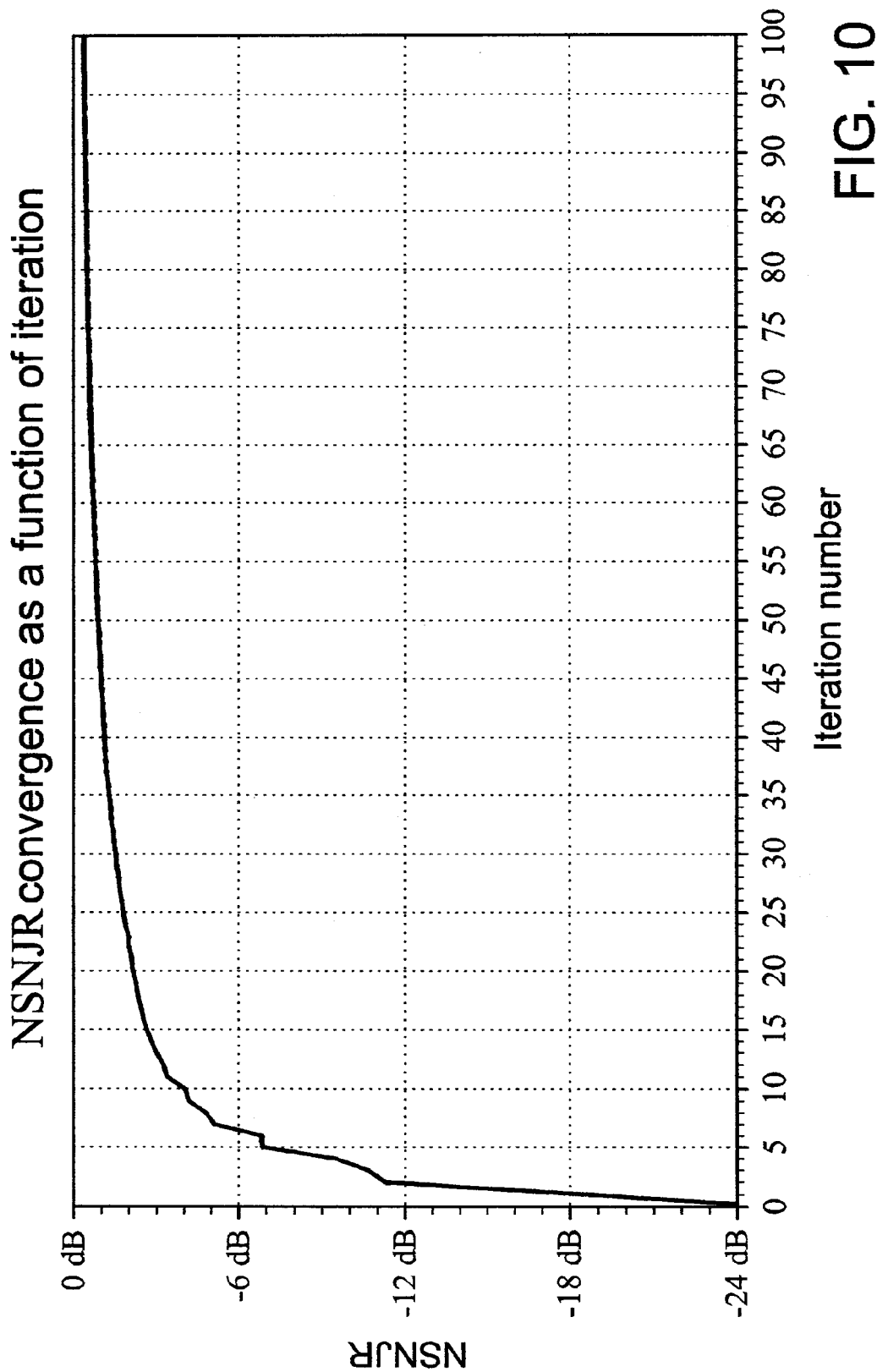
FIG. 10 schematically show NSNJR convergence as a function of iteration with uncorrelated sources.

An example is for the uncorrelated white bandwidth limited Gaussian noise, where the convergence of the iterative process is schematically illustrated in FIG. 10. This example comprises several uncorrelated noise generators each connected to the input of one FIR-filter. The output of each FIR-filter is connected to one sub array. FIG. 10 schematically illustrate the minimizing of NSNJR in relation to the number of iterations.

Figure 11:
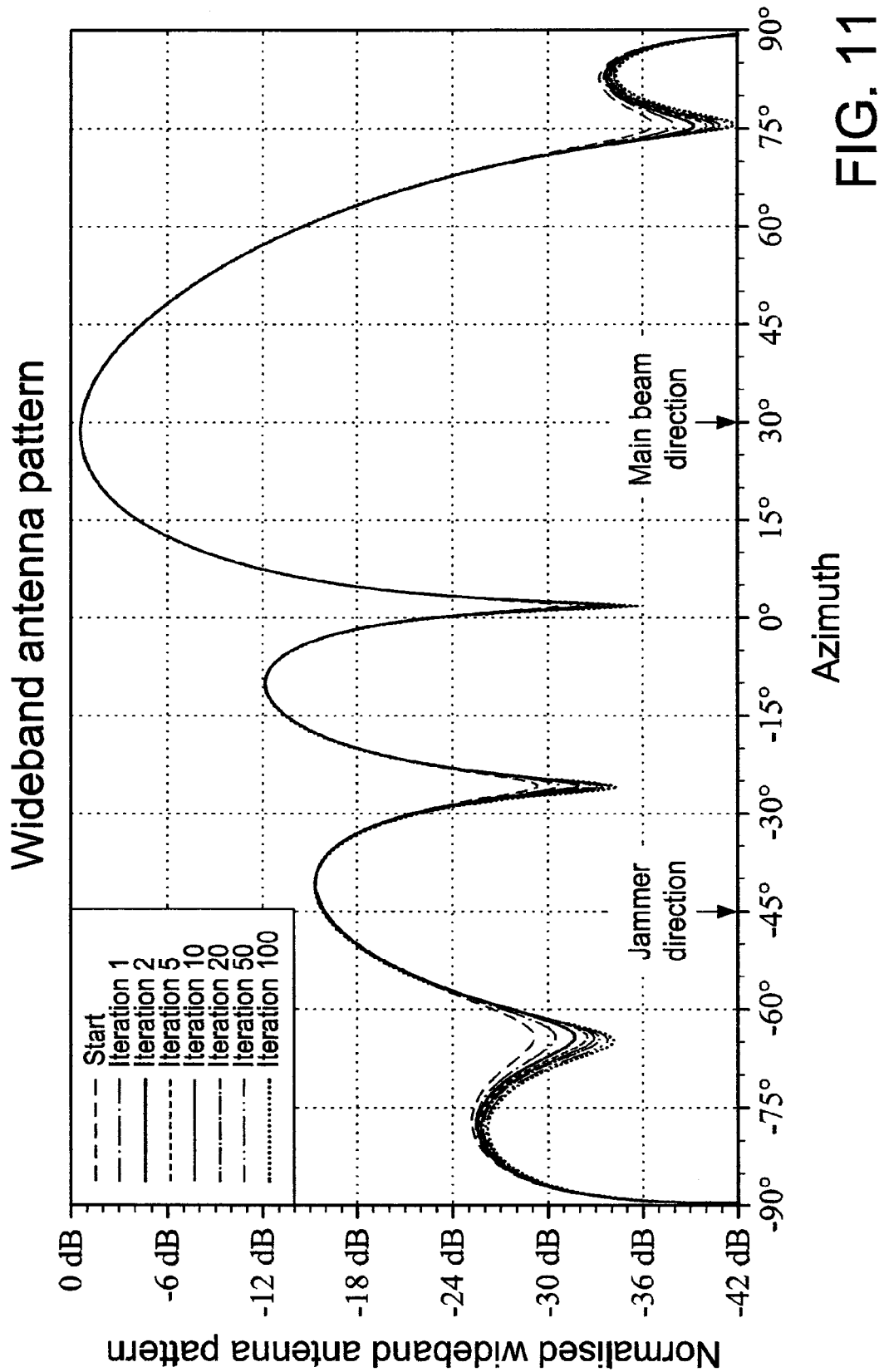
FIG. 11 schematically show wideband antenna pattern with uncorrelated sources.
Figure 12:
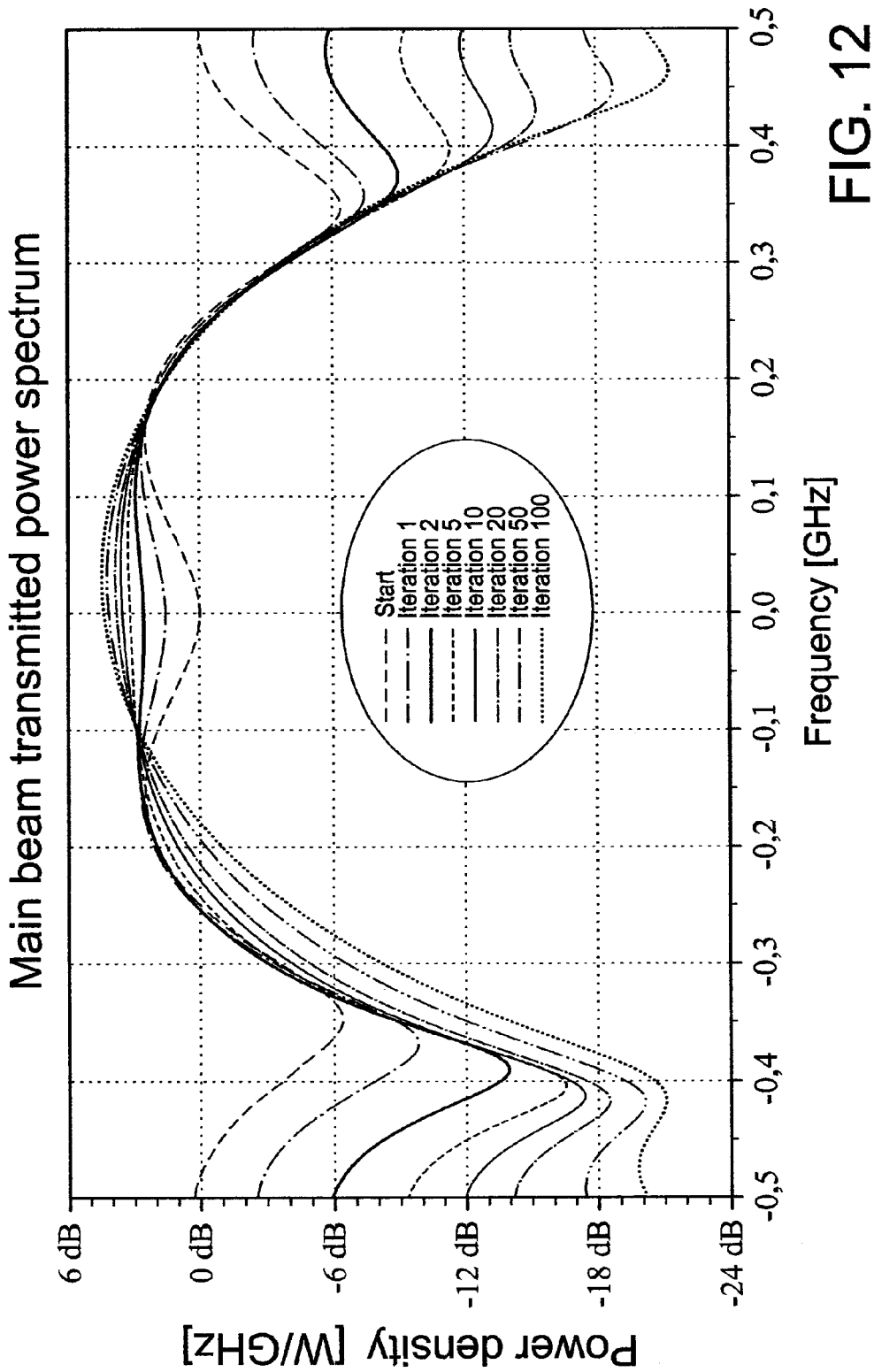
FIG. 12 schematically show main beam transmitted power spectrum with uncorrelated sources.
Figure 13:
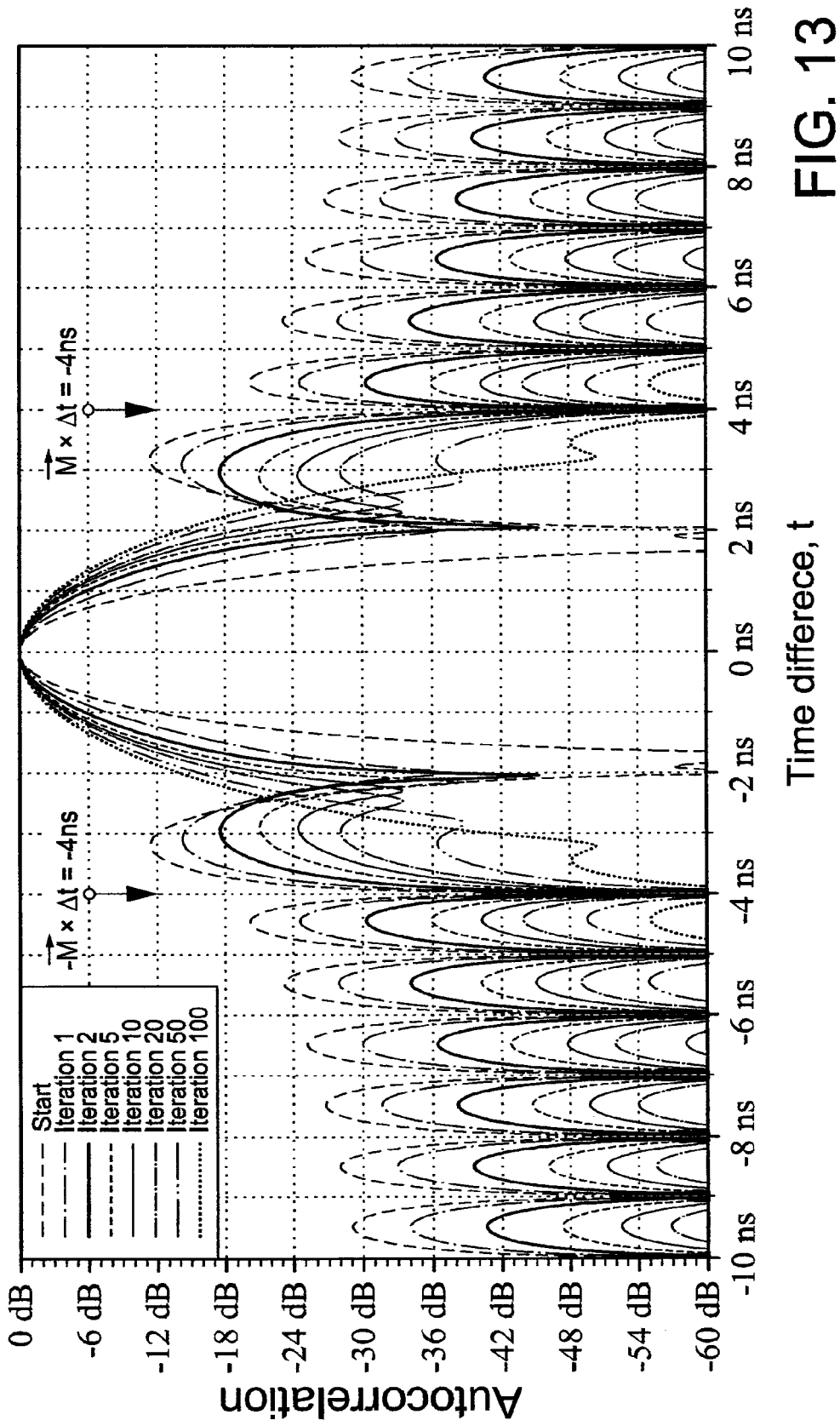
FIG. 13 schematically main beam transmitted waveform autocorrelation function with uncorrelated sources.

The wideband antenna pattern, the transmitted power spectrum in the main beam direction, and the autocorrelation function of the waveform transmitted in the main beam direction are plotted in FIG. 11, FIG. 12, and FIG. 13 respectively for the transmit FIR-filter coefficients obtained after one, two, five, ten, twenty, fifty, and one hundred iterations. The wideband transmit antenna pattern illustrated in FIG. 11 has a lower gain compared to the example with correlated white bandwidth limited Gaussian noise illustrated in FIG. 8 due to the much wider main beam. The wide main beam, for the example with uncorrelated white bandwidth limited Gaussian noise, reflects the size of the sub array rather than the size of the antenna. This might at a first glance appear as a loss, but it is possible to regain this loss by extension of the integration time on the receive side if a cluster of receive beams covering the total transmit main beam is used. This non-loss both improves the LPI, Low Probability of Intercept, performance and decreases the reaction time of the system. One receiver is needed for each receive main beam.

The side lobe level of the wideband antenna pattern for a few side lobes, particularly for the side lobes adjacent to the main beam and also in the direction of the repetition jammer, increases during the convergence of the iterative process for the example with correlated white bandwidth limited Gaussian noise while the wideband antenna pattern for the example with uncorrelated white bandwidth limited Gaussian noise remains stable, even in the direction of the repetition jammer, during the convergence of the iterative process. The behavior of both the power spectrum and the autocorrelation function in the main beam direction is very similar for both examples. The power spectrum becomes more narrowbanded with a smooth maximum during the convergence of the iterative process and this results naturally in a wider peak of the auto correlation function with reduced side lobes. In both examples are the minima on each side of the peak of the auto correlation function gradually filled out during the convergence of the iterative process. Values of NSNJR close to 0 dB are obtained after convergence of the iterative process.

An antenna operating under wideband conditions radiates directional dependent waveforms. It is thus not possible to separate spatial and temporal filtering, as is usually done in narrow band systems, if the antenna operates under these conditions. The waveform radiated towards the target and the waveform radiated towards the jammer is thus different. The jammer may be a repetition jammer or a strong clutter reflection. In the examples of the present invention the matched filter are matched to the waveform radiated and received in the main beam direction and demonstrate that considerable attenuation, in the matched filter, of the waveform returned from the jammed direction can be obtained by proper waveform selection. This is equivalent to reception of nearly orthogonal waveforms in the direction from the jammer and in the direction from the target.

It should further be noticed that no spatial receive cancellation is used in the examples of the present invention to ensure that all attenuation of the jammer is achieved by proper waveform selection only. The combination of proper waveform selection, deterministic spatial transmit cancellation, and adaptive spatial receive cancellation is to prefer in an operational system. The above experimental results indicate that an uncorrelated noise source preceding each transmit FIR-filter combined with a cluster of receive beams covering the total transmit main beam suppress repetition jammer and clutter signals. The gain loss due to the wide transmit main beam is fully regained by a proportional extension of the integration time. The main beam width reflects the size of the sub array rather than the size of the antenna. One signal processing chain is needed for each receive main beam.

The present invention enables suppression of repetition jammers by proper waveform selection. Further, the present invention also enables clutter suppression by proper waveform selection The invention is not limited to the example described above, but may be modified without departing from the scope of the claims below.

The terminology used herein is for the purpose of describing particular examples only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles, preferred examples and modes of operation of the present invention. However, the invention should be regarded as illustrative rather than restrictive, and not as being limited to the particular examples discussed above. The different features of the various examples of the invention can be combined in other combinations than those explicitly described. It should therefore be appreciated that variations may be made in those examples by those skilled in the art without departing from the scope of the present invention as defined by the following claims.

Nomenclature
Constants
$c_0$ is the speed of light
$\gamma$ is Euler's constant, approximately equal to: 0.5772156649015328606065l2
Unary Operators
$g^*$ is the complex conjugate operator acting on g
$\Im[g(t)]$ is the Fourier transform operator acting on g(t)
$\Im^{-1}[G(\omega)]$ is the inverse Fourier transform operator acting on $G(\omega)$
$M^T$ is the transpose operator acting on the matrix M Binary Operators
- • is the scalar product operator
- · is the multiplication operator
- ⊙ is the correlation operator
- * is the convolution operator Integers Variables $\vec{M}$ is equal to the number of taps in each transmit FIR-filter $\overleftarrow{M}$ is equal to the number of taps in each receive FIR-filter $\vec{N}_s$ number of transmit sub arrays $\overleftarrow{N}_s$ number of receive sub arrays $\vec{N}_e(\vec{n}_s)$ number of transmit elements in transmit sub array $\vec{n}_s$ $\overleftarrow{N}_e(\overleftarrow{n}_s)$ number of receive elements in receive sub array $\overleftarrow{n}_s$ J is equal to the total number of jammers j is the jammers counting index j∈{0 ... (J−1)}, not to be confused with the imaginary unit $\vec{\alpha}$ is equal to unity if the transmit sub arrays are phase shifter controlled and zero otherwise $\overleftarrow{\alpha}$ is equal to unity if the receive sub arrays are phase shifter controlled and zero otherwise $\vec{\beta}$ is equal to unity if the transmit sub arrays are TTD controlled and zero otherwise $\overleftarrow{\beta}$ is equal to unity if the receive sub arrays are TTD controlled and zero otherwise $\vec{\gamma}$ is equal to unity if the transmit elements are TTD controlled and zero if the elements are phase shifter controlled, not to be confused with Euler's constant $\overleftarrow{\gamma}$ is equal to unity if the receive elements are TTD controlled and zero if the elements are phase shifter controlled, not to be confused with Euler's constant η is equal to unity if $V_{\vec{n}_s}(t)$ are uncorrelated wideband white noise waveforms and zero if $V_{\vec{n}_s}(t)$ are correlated wideband white noise waveforms p is an arbitrary integer index q is another arbitrary integer index Geometrical Variables $\vec{r}_{\vec{n}_s}^s$ is the vector from the transmit antenna origin to the phase centre of transmit sub array $\vec{n}_s$ $\overleftarrow{r}_{\overleftarrow{n}_s}^s$ is the vector from the receive antenna origin to the phase centre of receive sub array $\overleftarrow{n}_s$ $\vec{r}_{\vec{n}_s,\vec{n}_e}^e$ is the vector from the phase centre of transmit sub array $\vec{n}_s$ to the phase centre of transmit element $\vec{n}_e$ in sub array, if all transmit sub arrays are identical the transmit sub array index, $\vec{n}_s$, can be omitted $\overleftarrow{r}_{\overleftarrow{n}_s,\overleftarrow{n}_e}^e$ is the vector from the phase centre of receive sub array $\overleftarrow{n}_s$ to the phase centre of receive element $\overleftarrow{n}_e$ in sub array $\overleftarrow{n}_s$, if all receive sub arrays are identical the receive sub array index, $\overleftarrow{n}_s$, can be omitted $\hat{r}_{MB}$ is the unit vector in the main beam direction $(\theta_{MB}, \phi_{MB})$ $\hat{r}_{e_{MB}}$ is the unit vector in the main beam direction of each element, assumed to be equal for all elements $\hat{r}$ is the unit vector in the observation direction $(\theta, \phi)$ $r_T$ is the range to the target $r_{J_j}$ is the range to repetition jammer number j Electrical Variables $\omega_{Bw}$ is the bandwidth of the used waveform $\omega_{cw}$ is the centre frequency of the used waveform $\vec{\omega}_B$ is the transmitter bandwidth $\vec{\omega}_c$ is the transmitter centre frequency $\overleftarrow{\omega}_B$ is the receiver bandwidth $\overleftarrow{\omega}_c$ is the receiver centre frequency $\overleftrightarrow{\omega}_B$ is the mutual bandwidth of the transmitter and receiver $\overleftrightarrow{\omega}_c$ is the mutual centre frequency of the transmitter and receiver Δt is equal to the delay between each tap in the FIR-filter $\vec{a}_{\vec{n}_e, \vec{n}_s}$ is the amplitude weight of transmit element $\vec{n}_e$ in transmit sub array $\vec{n}_s$ $\overleftarrow{a}_{\overleftarrow{n}_e, \overleftarrow{n}_s}$ is the amplitude weight of receive element $\overleftarrow{n}_e$ in receive sub array $\overleftarrow{n}_s$ $V_{\vec{n}_s}(t)$ is the waveform connected to transmit sub array $\vec{n}_s$ $v_{\vec{n}_s}(t)$ is the baseband part of $V_{\vec{n}_s}(t)$ D is the power attenuation between transmission and reception $D_T$ is the power attenuation between transmission and reception in the main beam direction equal to the target direction $D_{J_j}$ is the power attenuation between transmission and reception in the direction of jammer number j $\sigma_T$ is the radar cross section of the target NSNJR Normalised Signal to Noise-Jammer Ratio $PG_{J_j}$ is the power-gain product of repetition jammer number j (equal to the jammer strength)

$NJP_j$ is the jammer power normalized to the equivalent receiver noise level for repetition jammer number j $u_g$ is the effective value per square root of angular frequency of each waveform generator $P_g$ is the power density from each waveform generator, equal to $u_g^2$ Filter Coefficients $\vec{w}_{p,q}$ is the transmit FIR-filter coefficient for transmit sub array p and transmit FIR-filter tap q.

$\overleftarrow{w}_{p,q}$ is the receive FIR-filter coefficient for receive sub array p and receive FIR-filter tap q.

Functions

Π(x) is the rectangle function, defined as:

$$\Pi(x) = \begin{cases} 1 & \text{if } |x| < \frac{1}{2} \\ 0 & \text{if } |x| > \frac{1}{2} \end{cases}$$

$\vec{a}_e(\hat{r}, \hat{r}_{e_{MB}}, \omega_{cw})$ is the transmit element amplitude pattern at the waveform centre frequency in the observation direction $(\theta, \phi)$ $\overleftarrow{a}_e(\hat{r}, \hat{r}_{e_{MB}}, \omega_{cw})$ is the receive element amplitude pattern at the waveform centre frequency in the observation direction $(\theta, \phi)$ $\overrightarrow{EP}(\hat{r}, \hat{r}_{e_{MB}}, \omega_{cw})$ is the transmit element power pattern at the waveform centre frequency in the observation direction $(\theta, \phi)$, equal to $\vec{a}^*_e(\hat{r}, \hat{r}_{e_{MB}}, \omega_{cw}) \cdot \vec{a}_e(\hat{r}, \hat{r}_{e_{MB}}, \omega_{cw})$ $\overleftarrow{EP}(\hat{r}, \hat{r}_{e_{MB}}, \omega_{cw})$ is the receive element power pattern at the waveform centre frequency in the observation direction $(\theta, \phi)$, equal to $\overleftarrow{a}^*_e(\hat{r}, \hat{r}_{e_{MB}}, \omega_{cw}) \cdot \overleftarrow{a}_e(\hat{r}, \hat{r}_{e_{MB}}, \omega_{cw})$ $\vec{h}_p(\hat{r}, \hat{r}_{MB}, t)$ is the transmit sub array impulse response for transmit sub array p $\tilde{h}_p(\hat{r},\hat{r}_{MB},t)$ is the receive sub array impulse response for receive sub array p $\vec{\tau}_p(\hat{r},\hat{r}_{MB})$ is equal to:

$$\frac{\vec{r}_p^{sT} \cdot (\hat{r} - \hat{r}_{MB})}{c_0}$$

$\overleftarrow{\tau}_p(\hat{r},\hat{r}_{MB})$ is equal to:

$$\frac{\vec{r}_p^{sT} \cdot (\hat{r} - \hat{r}_{MB})}{c_0}$$

$\vec{\tau}_{\alpha_{\bar{n}_s,\bar{n}_e}}(\hat{r}_{MB})$ is equal to:

$$\frac{1}{c_0} \cdot [\vec{\alpha} \cdot \vec{r}_{\bar{n}_s}^s + (1-\vec{\gamma}) \cdot \vec{r}_{\bar{n}_s,\bar{n}_e}^e]^T \cdot \hat{r}_{MB}$$

$\overleftarrow{\tau}_{\alpha_{\bar{n}_s,\bar{n}_e}}(\hat{r}_{MB})$ is equal to:

$$\frac{1}{c_0} \cdot [\vec{\alpha} \cdot \vec{r}_{\bar{n}_s}^s + (1-\vec{\gamma}) \cdot \vec{r}_{\bar{n}_s,\bar{n}_e}^e]^T \cdot \hat{r}_{MB}$$

$\vec{\tau}_{\beta_{\bar{n}_s,\bar{n}_e}}(\hat{r},\hat{r}_{MB})$ is equal to:

$$\frac{1}{c_0} \cdot \left\{ [\vec{\beta} \cdot \vec{r}_{\bar{n}_s}^s + \vec{\gamma} \cdot \vec{r}_{\bar{n}_s,\bar{n}_e}^e]^T \cdot \hat{r}_{MB} - \vec{r}_{\bar{n}_s,\bar{n}_e}^{eT} \cdot \hat{r} \right\}$$

$\overleftarrow{\tau}_{\beta_{\bar{n}_s,\bar{n}_e}}(\hat{r},\hat{r}_{MB})$ is equal to:

$$\frac{1}{c_0} \cdot \left\{ [\vec{\beta} \cdot \vec{r}_{\bar{n}_s}^s + \vec{\gamma} \cdot \vec{r}_{\bar{n}_s,\bar{n}_e}^e]^T \cdot \hat{r}_{MB} - \vec{r}_{\bar{n}_s,\bar{n}_e}^{eT} \cdot \hat{r} \right\}$$

$P_{Tx}(\vec{r}_{J_j},\vec{r}_{MB})$ is the transmitted power in the direction of repetition jammer number j $R(\tau)$ is the cross-correlation between the waveform returned from the target and the superposition of the waveforms returned from all clutter and repetition jammers $S_{Tx}(\omega)$ is the transmitted power spectrum in the main beam direction $V_{Tx}(\vec{r},\vec{r}_{MB},t)$ is the transmitted waveform $V_{Rx}(\vec{r},\vec{r}_{MB},t)$ is the received waveform $v_{Rx}(\vec{r},\vec{r}_{MB},t)$ is the baseband part of $V_{Rx}(\vec{r},\vec{r}_{MB},t)$ $u_B(\vec{r},\vec{r}_{MB},t)$ is the is the resulting baseband waveform after matched filtering Si(x) is the Sine integral Ci(x) is the Cosine integral Equations $$S = \frac{P_g \cdot D_T \cdot \vec{\omega}_B}{\vec{N}_s^2} \cdot \overrightarrow{EP}(\hat{r}_{MB},\hat{r}_{e_{MB}},\omega_{cw}) \cdot \overleftarrow{EP}(\hat{r}_{MB},\hat{r}_{e_{MB}},\omega_{cw}) \cdot \qquad \text{(Equation 2.7.2)}$$

$$\sum_{\bar{n}_s'=0}^{\bar{N}_s-1} \sum_{\grave{n}_s=0}^{\bar{N}_s-1} \sum_{\acute{n}_s'=0}^{\bar{N}_s-1} \sum_{\acute{n}_s=0}^{\bar{N}_s-1} \sum_{\grave{n}_s=0}^{\bar{N}_s-1} \sum_{\bar{n}_s=0}^{\bar{N}_s-1} \sum_{\bar{n}_s'=0}^{\bar{N}_s-1} \sum_{\bar{n}_s=0}^{\bar{N}_s-1} \sum_{\grave{m}'=0}^{\bar{M}-1} \sum_{\grave{m}=0}^{\bar{M}-1} \sum_{\acute{m}'=0}^{\bar{M}-1} \sum_{\acute{m}=0}^{\bar{M}-1} \sum_{\grave{m}'=0}^{\bar{M}-1} \sum_{\grave{m}=0}^{\bar{M}-1} \sum_{\bar{m}'=0}^{\bar{M}-1} \sum_{\bar{m}=0}^{\bar{M}-1} \left\{ \begin{array}{l} 1 \quad \text{if } \eta = 0 \\ \delta_{\bar{n}_s',\bar{n}_s} \cdot \delta_{\bar{n}_s',\bar{n}_s} \quad \text{if } \eta = 1 \end{array} \right\} \cdot$$

$$\vec{w}_{\bar{n}_s',\grave{m}'} \cdot \vec{w}_{\bar{n}_s,\grave{m}}^* \cdot \vec{w}_{\bar{n}_s',\acute{m}'} \cdot \vec{w}_{\bar{n}_s,\acute{m}} \cdot \vec{w}_{\bar{n}_s',\grave{m}'} \cdot \vec{w}_{\bar{n}_s,\grave{m}}^* \cdot \vec{w}_{\bar{n}_s',\bar{m}'}^* \cdot \vec{w}_{\bar{n}_s,\bar{m}} \cdot e^{j \cdot \omega_{cw} \cdot (\grave{m}' - \grave{m} - \acute{m}' + \acute{m} + \grave{m}' - \grave{m} - \bar{m}' + \bar{m}) \cdot \Delta t}$$

$$\sum_{\bar{n}_e'=0}^{\bar{N}_e(\bar{n}_s')-1} \sum_{\grave{n}_e=0}^{\bar{N}_e(\bar{n}_s)-1} \sum_{\acute{n}_e'=0}^{\bar{N}_e(\bar{n}_s')-1} \sum_{\acute{n}_e=0}^{\bar{N}_e(\bar{n}_s)-1} \sum_{\grave{n}_e'=0}^{\bar{N}_e(\bar{n}_s')-1} \sum_{\grave{n}_e=0}^{\bar{N}_e(\bar{n}_s)-1} \sum_{\bar{n}_e'=0}^{\bar{N}_e(\bar{n}_s')-1} \sum_{\bar{n}_e=0}^{\bar{N}_e(\bar{n}_s)-1} \vec{a}_{\bar{n}_e',\bar{n}_s'} \cdot \vec{a}_{\bar{n}_e,\bar{n}_s}^* \cdot \vec{a}_{\bar{n}_e',\bar{n}_s'}^* \cdot$$

$$\vec{a}_{\bar{n}_e,\bar{n}_s} \cdot \vec{a}_{\bar{n}_e',\bar{n}_s'} \cdot \vec{a}_{\bar{n}_e,\bar{n}_s}^* \cdot \vec{a}_{\bar{n}_e',\bar{n}_s'}^* \cdot \vec{a}_{\bar{n}_e,\bar{n}_s} \cdot e^{-j\cdot\omega_{cw}} \cdot \left[ \vec{\tau}_{\alpha_{\bar{n}_s',\bar{n}_s'}}(\hat{r}_{MB}) - \overleftarrow{\tau}_{\alpha_{\bar{n}_s,\bar{n}_e}}(\right.$$

$$\hat{r}_{MB}) - \vec{\tau}_{\alpha_{\bar{n}_s',\bar{n}_e'}}(\hat{r}_{MB}) + \vec{\tau}_{\alpha_{\bar{n}_s,\bar{n}_e}}(\hat{r}_{MB}) + \overleftarrow{\tau}_{\alpha_{\bar{n}_s',\bar{n}_e'}}(\hat{r}_{MB}) - \overleftarrow{\tau}_{\alpha_{\bar{n}_s,\bar{n}_e}}(\hat{r}_{MB}) -$$

$$\overleftarrow{\tau}_{\alpha_{\bar{n}_s',\bar{n}_e'}}(\hat{r}_{MB}) + \overleftarrow{\tau}_{\alpha_{\bar{n}_s,\bar{n}_e}}(\hat{r}_{MB}) \right] \cdot \text{sinc}\left[ \frac{\vec{\omega}_B}{2} \cdot ((\grave{m}' - \grave{m} - \acute{m}' + \acute{m}) + 3 \cdot (\grave{m}' -$$

$$\grave{m} - \bar{m}' + \bar{m})) \cdot \Delta t + \vec{\tau}_{\beta_{\bar{n}_s',\bar{n}_e'}}(\hat{r}_{MB},\hat{r}_{MB}) - \vec{\tau}_{\beta_{\bar{n}_s,\bar{n}_e}}(\hat{r}_{MB},\hat{r}_{MB}) -$$

$$\vec{\tau}_{\beta_{\bar{n}_s',\bar{n}_e'}}(\hat{r}_{MB},\hat{r}_{MB}) + \vec{\tau}_{\beta_{\bar{n}_s,\bar{n}_e}}(\hat{r}_{MB},\hat{r}_{MB}) + \overleftarrow{\tau}_{\beta_{\bar{n}_s',\bar{n}_e'}}(\hat{r}_{MB},\hat{r}_{MB}) -$$

$$\overleftarrow{\tau}_{\beta_{\bar{n}_s,\bar{n}_e}}(\hat{r}_{MB},\hat{r}_{MB}) - \overleftarrow{\tau}_{\beta_{\bar{n}_s',\bar{n}_e'}}(\hat{r}_{MB},\hat{r}_{MB}) + \overleftarrow{\tau}_{\beta_{\bar{n}_s,\bar{n}_e}}(\hat{r}_{MB},\hat{r}_{MB}) \right)]$$

-continued $$J = \frac{P_g \cdot \overleftrightarrow{\omega}_B}{\vec{N}_s^2} \cdot \sum_{j=0}^{J-1} D_{J_j} \cdot \overrightarrow{EP}(\hat{r}_{J_j}, \hat{r}_{e_{MB}}, \omega_{cw}) \cdot \overleftarrow{EP}(\hat{r}_{J_j}, \hat{r}_{e_{MB}}, \omega_{cw}) \cdot$$ (Equation 2.7.4)

$$\sum_{\vec{n}_s'=0}^{\vec{N}_s-1}\sum_{\vec{n}_s=0}^{\vec{N}_s-1}\sum_{\vec{n}_s'=0}^{\vec{N}_s-1}\sum_{\vec{n}_s=0}^{\vec{N}_s-1}\sum_{\vec{n}_s'=0}^{\vec{N}_s-1}\sum_{\vec{n}_s=0}^{\vec{N}_s-1}\sum_{\vec{n}_s'=0}^{\vec{N}_s-1}\sum_{\vec{n}_s=0}^{\vec{N}_s-1}\sum_{\vec{m}'=0}^{\overline{M}-1}\sum_{\vec{m}=0}^{\overline{M}-1}\sum_{\vec{m}'=0}^{\overline{M}-1}\sum_{\vec{m}=0}^{\overline{M}-1}\sum_{\vec{m}'=0}^{\overline{M}-1}\sum_{\vec{m}=0}^{\overline{M}-1}\left\{\begin{array}{ll}1 & \text{if } \eta=0 \\ \delta_{\vec{n}_s',\vec{n}_s}\cdot\delta_{\vec{n}_s',\vec{n}_s} & \text{if } \eta=1\end{array}\right\} \cdot$$

$$\vec{w}_{\vec{n}_s',\vec{m}'} \cdot \vec{w}^*_{\vec{n}_s,\vec{m}} \cdot \vec{w}^*_{\vec{n}_s',\vec{m}'} \cdot \vec{w}_{\vec{n}_s,\vec{m}} \cdot \overleftarrow{w}_{\vec{n}_s',\vec{m}'} \cdot \overleftarrow{w}^*_{\vec{n}_s,\vec{m}} \cdot \overleftarrow{w}^*_{\vec{n}_s',\vec{m}'} \cdot \overleftarrow{w}_{\vec{n}_s,\vec{m}} \cdot$$

$$e^{j\omega_{cw}\left[(\vec{m}'-\vec{m}-\vec{m}'+\vec{m}+\vec{m}'-\vec{m}-\vec{m}'+\vec{m})\Delta t + \vec{\tau}_{\vec{n}_s'}(\hat{r}_{J_j},\hat{r}_{MB})-\vec{\tau}_{\vec{n}_s}(\hat{r}_{J_j},\hat{r}_{MB})+\overleftarrow{\tau}_{\vec{n}_s'}(\hat{r}_{J_j},\hat{r}_{MB})-\overleftarrow{\tau}_{\vec{n}_s}(\hat{r}_{J_j},\hat{r}_{MB})\right]}.$$

$$\sum_{\vec{n}_e'=0}^{\vec{N}_e(\vec{n}_s')-1}\sum_{\vec{n}_e=0}^{\vec{N}_e(\vec{n}_s)-1}\sum_{\vec{n}_e'=0}^{\vec{N}_e(\vec{n}_s')-1}\sum_{\vec{n}_e=0}^{\vec{N}_e(\vec{n}_s)-1}\sum_{\vec{n}_e'=0}^{\vec{N}_e(\vec{n}_s')-1}\sum_{\vec{n}_e=0}^{\vec{N}_e(\vec{n}_s)-1}\sum_{\vec{n}_e'=0}^{\vec{N}_e(\vec{n}_s')-1}\sum_{\vec{n}_e=0}^{\vec{N}_e(\vec{n}_s)-1} \vec{a}_{\vec{n}_e',\vec{n}_s'} \cdot \vec{a}^*_{\vec{n}_e,\vec{n}_s} \cdot \vec{a}^*_{\vec{n}_e',\vec{n}_s'} \cdot \vec{a}_{\vec{n}_e,\vec{n}_s} \cdot \overleftarrow{a}_{\vec{n}_e',\vec{n}_s'} \cdot \overleftarrow{a}^*_{\vec{n}_e,\vec{n}_s} \cdot \overleftarrow{a}^*_{\vec{n}_e',\vec{n}_s'} \cdot \overleftarrow{a}_{\vec{n}_e,\vec{n}_s} \cdot$$

$$e^{-j\omega_{cw}\left[\vec{\tau}_{\alpha_{\vec{n}_s',\vec{n}_e'}}(\hat{r}_{MB})-\vec{\tau}_{\alpha_{\vec{n}_s,\vec{n}_e}}(\hat{r}_{MB})-\vec{\tau}_{\alpha_{\vec{n}_s',\vec{n}_e'}}(\hat{r}_{MB})+\vec{\tau}_{\alpha_{\vec{n}_s,\vec{n}_e}}(\hat{r}_{MB})+\overleftarrow{\tau}_{\alpha_{\vec{n}_s',\vec{n}_e'}}(\hat{r}_{MB})-\overleftarrow{\tau}_{\alpha_{\vec{n}_s,\vec{n}_e}}(\hat{r}_{MB})-\overleftarrow{\tau}_{\alpha_{\vec{n}_s',\vec{n}_e'}}(\hat{r}_{MB})+\overleftarrow{\tau}_{\alpha_{\vec{n}_s,\vec{n}_e}}(\hat{r}_{MB})\right]}.$$

$$\text{sinc}\left[\frac{\overleftrightarrow{\omega}_B}{2}\cdot\left(((\vec{m}'-\vec{m}-\vec{m}'+\vec{m})+3\cdot(\vec{m}'-\vec{m}-\vec{m}'+\vec{m}))\cdot\Delta t + 2\cdot\vec{\tau}_{\vec{n}_s'}(\hat{r}_{J_j},\hat{r}_{MB})-2\cdot\vec{\tau}_{\vec{n}_s}(\hat{r}_{J_j},\hat{r}_{MB})+3\cdot\overleftarrow{\tau}_{\vec{n}_s'}(\hat{r}_{J_j},\hat{r}_{MB})-\right.\right.$$
$$3\cdot\overleftarrow{\tau}_{\vec{n}_s}(\hat{r}_{J_j},\hat{r}_{MB})+\vec{\tau}_{\beta_{\vec{n}_s',\vec{n}_e'}}(\hat{r}_{MB},\hat{r}_{MB})-\vec{\tau}_{\beta_{\vec{n}_s,\vec{n}_e}}(\hat{r}_{J_j},\hat{r}_{MB})-$$
$$\vec{\tau}_{\beta_{\vec{n}_s',\vec{n}_e'}}(\hat{r}_{MB},\hat{r}_{MB})+\vec{\tau}_{\beta_{\vec{n}_s,\vec{n}_e}}(\hat{r}_{J_j},\hat{r}_{MB})+\overleftarrow{\tau}_{\beta_{\vec{n}_s',\vec{n}_e'}}(\hat{r}_{MB},\hat{r}_{MB})-$$
$$\left.\left.\overleftarrow{\tau}_{\beta_{\vec{n}_s,\vec{n}_e}}(\hat{r}_{J_j},\hat{r}_{MB})-\overleftarrow{\tau}_{\beta_{\vec{n}_s',\vec{n}_e'}}(\hat{r}_{MB},\hat{r}_{MB})+\overleftarrow{\tau}_{\beta_{\vec{n}_s,\vec{n}_e}}(\hat{r}_{J_j},\hat{r}_{MB})\right)\right]$$

(Equation 2.7.5)

$$N = E\left[\frac{\sqrt{\overleftrightarrow{\omega}_B}\cdot v_{Rx}(\hat{r}_{MB},\hat{r}_{MB},-t)}{\vec{N}_s\cdot u_g\cdot\sqrt{D_T}\cdot\vec{a}_e(\hat{r}_{MB},\hat{r}_{e_{MB}},\omega_{cw})\cdot\overleftarrow{a}_e(\hat{r}_{MB},\hat{r}_{e_{MB}},\omega_{cw})}*\frac{\overleftrightarrow{\omega}_B}{\pi}\cdot\sum_{\vec{n}_s=0}^{\vec{N}_s-1}\sum_{\vec{m}=0}^{\overline{M}-1}\overleftarrow{w}^*_{\vec{n}_s,\vec{m}}\cdot\right.$$

$$\sum_{\vec{n}_e=0}^{\vec{N}_e(\vec{n}_s)-1}\overleftarrow{a}^*_{\vec{n}_e,\vec{n}_s}\cdot\cos(\overleftrightarrow{\omega}_c\cdot t)\cdot\text{sinc}\left(\frac{\overleftrightarrow{\omega}_B}{2}\cdot t\right)*\upsilon^*_{\vec{n}_e,\vec{n}_s}(t)\cdot$$

$$\frac{\sqrt{\overleftrightarrow{\omega}_B}\cdot v^*_{Rx}(\hat{r}_{MB},\hat{r}_{MB},-t)}{\vec{N}_s\cdot u_g\cdot\sqrt{D_T}\cdot\vec{a}^*_e(\hat{r}_{MB},\hat{r}_{e_{MB}},\omega_{cw})\cdot\overleftarrow{a}^*_e(\hat{r}_{MB},\hat{r}_{e_{MB}},\omega_{cw})}*$$

$$\left.\frac{\overleftrightarrow{\omega}_B}{\pi}\cdot\sum_{\vec{n}_s=0}^{\vec{N}_s-1}\sum_{\vec{m}=0}^{\overline{M}-1}\overleftarrow{w}_{\vec{n}_s,\vec{m}}\cdot\sum_{\vec{n}_e=0}^{\vec{N}_e(\vec{n}_s)-1}\overleftarrow{a}_{\vec{n}_e,\vec{n}_s}\cdot\cos(\overleftrightarrow{\omega}_c\cdot t)\cdot\text{sinc}\left(\frac{\overleftrightarrow{\omega}_B}{2}\cdot t\right)*\upsilon_{\vec{n}_e,\vec{n}_s}(t)\right]$$

(Equation 2.7.6)

$$N = \frac{N_0\cdot\overleftrightarrow{\omega}_B}{\vec{N}_s^2}\cdot$$

$$\sum_{\vec{n}_s'=0}^{\vec{N}_s-1}\sum_{\vec{n}_s'=0}^{\vec{N}_s-1}\sum_{\vec{n}_s=0}^{\vec{N}_s-1}\sum_{\vec{n}_s=0}^{\vec{N}_s-1}\sum_{\vec{n}_s'=0}^{\vec{N}_s-1}\sum_{\vec{n}_s=0}^{\vec{N}_s-1}\sum_{\vec{m}'=0}^{\overline{M}-1}\sum_{\vec{m}=0}^{\overline{M}-1}\sum_{\vec{m}'=0}^{\overline{M}-1}\sum_{\vec{m}=0}^{\overline{M}-1}$$

$$\vec{w}_{\vec{n}_s',\vec{m}'}\cdot\vec{w}^*_{\vec{n}_s',\vec{m}'}\cdot\vec{w}_{\vec{n}_s,\vec{m}}\cdot\vec{w}^*_{\vec{n}_s,\vec{m}}\cdot\overleftarrow{w}^*_{\vec{n}_s,\vec{m}}\cdot\overleftarrow{w}_{\vec{n}_s,\vec{m}}\cdot$$

$$e^{j\omega_{cw}\cdot(\vec{m}'-\vec{m}+\vec{m}'-\vec{m}')\cdot\Delta t}\cdot$$

-continued $$\sum_{\vec{n}_e'=0}^{\vec{N}_e(\vec{n}_s)-1}\sum_{\vec{n}_e'=0}^{\vec{N}_e(\vec{n}_s)-1}\sum_{\vec{n}_e=0}^{\vec{N}_e(\vec{n}_s)-1}\sum_{\vec{n}_e=0}^{\vec{N}_e(\vec{n}_s)-1}\sum_{\vec{n}_e'=0}^{\vec{N}_e(\vec{n}_s')-1}\sum_{\vec{n}_e=0}^{\vec{N}_e(\vec{n}_s)-1}\vec{a}_{\vec{n}_e',\vec{n}_s}\cdot$$

$$\vec{a}^*_{\vec{n}_e',\vec{n}_s'}\cdot\overleftarrow{a}_{\vec{n}_e,\vec{n}_s}\cdot\overleftarrow{a}^*_{\vec{n}_e,\vec{n}_s}\cdot\vec{a}^*_{\vec{n}_e',\vec{n}_s'}\cdot\overleftarrow{a}_{\vec{n}_e,\vec{n}_s}\cdot$$

$$e^{-j\omega_{cw}\cdot\left[\vec{\tau}_{\alpha_{\vec{n}_s',\vec{n}_e'}}(\hat{r}_{MB})-\vec{\tau}_{\alpha_{\vec{n}_s',\vec{n}_e'}}(\hat{r}_{MB})+\overleftarrow{\tau}_{\alpha_{\vec{n}_s,\vec{n}_e}}(\hat{r}_{MB})-\overleftarrow{\tau}_{\alpha_{\vec{n}_s,\vec{n}_e}}(\hat{r}_{MB})\right]}.$$

$$\delta_{\vec{n}_s,\vec{n}_s}\cdot\delta_{\vec{n}_e,\vec{n}_e}$$

(Equation 2.7.8)

$$S_{max} = \frac{P_g\cdot D_T\cdot\overleftrightarrow{\omega}_B}{\vec{N}_s^2}\cdot\overrightarrow{EP}(\hat{r}_{MB},\hat{r}_{e_{MB}},\omega_{cw})\cdot\overleftarrow{EP}(\hat{r}_{MB},\hat{r}_{e_{MB}},\omega_{cw})\cdot$$

$$\sum_{\vec{n}_s'=0}^{\vec{N}_s-1}\sum_{\vec{n}_s=0}^{\vec{N}_s-1}\sum_{\vec{n}_s'=0}^{\vec{N}_s-1}\sum_{\vec{n}_s=0}^{\vec{N}_s-1}\sum_{\vec{n}_s'=0}^{\vec{N}_s-1}\sum_{\vec{n}_s=0}^{\vec{N}_s-1}\sum_{\vec{n}_s'=0}^{\vec{N}_s-1}\sum_{\vec{n}_s=0}^{\vec{N}_s-1}\sum_{\vec{m}'=0}^{\overline{M}-1}\sum_{\vec{m}=0}^{\overline{M}-1}\sum_{\vec{m}'=0}^{\overline{M}-1}\sum_{\vec{m}=0}^{\overline{M}-1}$$

$$\sum_{\vec{m}'=0}^{\overline{M}-1}\sum_{\vec{m}=0}^{\overline{M}-1}\left\{\begin{array}{ll}1 & \text{if } \eta=0 \\ \delta_{\vec{n}_s',\vec{n}_s}\cdot\delta_{\vec{n}_s',\vec{n}_s} & \text{if } \eta=1\end{array}\right\}\cdot\vec{w}_{\vec{n}_s,\vec{m}'}\cdot\vec{w}^*_{\vec{n}_s,\vec{m}}\cdot\vec{w}^*_{\vec{n}_s',\vec{m}'}\cdot$$

$$\vec{w}_{\vec{n}_s',\vec{m}}\cdot\overleftarrow{w}_{\vec{n}_s,\vec{m}'}\cdot\overleftarrow{w}^*_{\vec{n}_s,\vec{m}}\cdot\overleftarrow{w}^*_{\vec{n}_s',\vec{m}'}\cdot\overleftarrow{w}_{\vec{n}_s,\vec{m}}\cdot$$

$$e^{j\omega_{cw}\cdot(\vec{m}'-\vec{m}-\vec{m}'+\vec{m}+\vec{m}'-\vec{m}-\vec{m}'+\vec{m})\Delta t}\cdot$$

-continued $$\mathrm{sinc}\left[\frac{\vec{\omega}_B}{2}\cdot\left(((\vec{m}'-\vec{m}-\vec{m}'+\vec{m}))+3\cdot(\vec{m}'-\vec{m}-\vec{m}'+\vec{m})\right)\cdot\Delta t+\right.$$
$$\left.\frac{\left(\vec{r}_{n_s}^{s\prime}-\vec{r}_{n_s}^{s}-\vec{r}_{n_s}^{s\prime}+\vec{r}_{n_s}^{s}+\vec{r}_{n_s}^{s\prime}-\vec{r}_{n_s}^{s}-\vec{r}_{n_s}^{s\prime}+\vec{r}_{n_s}^{s}\right)^T\cdot\hat{r}_{MB}}{c_0}\right]\right]\cdot$$

$$\sum_{\vec{n}'_e=0}^{\vec{N}_e(\vec{n}'_s)-1}\sum_{\vec{n}_e=0}^{\vec{N}_e(\vec{n}_s)-1}\sum_{\vec{n}'_e=0}^{\vec{N}_e(\vec{n}'_s)-1}\sum_{\vec{n}_e=0}^{\vec{N}_e(\vec{n}_s)-1}\sum_{\vec{n}'_e=0}^{\vec{N}_e(\vec{n}'_s)-1}\sum_{\vec{n}_e=0}^{\vec{N}_e(\vec{n}_s)-1}\sum_{\vec{n}'_e=0}^{\vec{N}_e(\vec{n}'_s)-1}\sum_{\vec{n}_e=0}^{\vec{N}_e(\vec{n}_s)-1}$$

$$\vec{a}_{\vec{n}'_e,\vec{n}'_s}\cdot\vec{a}^*_{\vec{n}_e,\vec{n}_s}\cdot\vec{a}^*_{\vec{n}'_e,\vec{n}'_s}\cdot\vec{a}_{\vec{n}_e,\vec{n}_s}\cdot\vec{a}_{\vec{n}_e,\vec{n}_s}\cdot\vec{a}^*_{\vec{n}_e,\vec{n}_s}\cdot\vec{a}^*_{\vec{n}'_e,\vec{n}'_s}\cdot\vec{a}_{\vec{n}_e,\vec{n}_s}$$

(Equation 2.8.2)

$$P_{Tx}(\hat{r},\hat{r}_{MB})=P_g\cdot\vec{\omega}_B\cdot\overline{EP}(\hat{r},\hat{r}_{e_{MB}},\omega_{cw})\cdot$$

$$\sum_{\vec{n}_s=0}^{\vec{N}_s-1}\sum_{\vec{n}_s=0}^{\vec{N}_s-1}\left\{\begin{array}{ll}1 & \text{if }\eta=0\\ \delta_{\vec{n}_s,\vec{n}_s} & \text{if }\eta=1\end{array}\right\}\cdot\sum_{\vec{m}=0}^{\overline{M}-1}\sum_{\vec{m}=0}^{\overline{M}-1}\vec{w}^*_{\vec{n}_s,\vec{m}}\cdot\vec{w}_{\vec{n}_s,\vec{m}}\cdot$$

$$e^{-j\omega_{cw}\cdot\left[(\vec{m}-\vec{m})\cdot\Delta t+\frac{(\vec{r}_{n_s}^s-\vec{r}_{n_s}^s)^T\cdot(\hat{r}-(\vec{\alpha}+\vec{\beta})\hat{r}_{MB})}{c_0}\right]}\cdot\sum_{\vec{n}_e=0}^{\vec{N}_e(\vec{n}_s)-1}\sum_{\vec{n}_e=0}^{N_e(\vec{n}_s)-1}\vec{a}^*_{\vec{n}_e,\vec{n}_s}\cdot$$

$$\vec{a}_{\vec{n}_e,\vec{n}_s}\cdot e^{-j\omega_{cw}\cdot\frac{(\vec{r}_{n_s,n_e}^e-\vec{r}_{n_s,n_e}^e)^T\cdot(\hat{r}-\hat{r}_{MB})}{c_0}}\cdot\mathrm{sinc}\left(\frac{\vec{\omega}_B}{2}\cdot\left[(\vec{m}-\vec{m})\cdot\Delta t+\right.\right.$$

$$\left.\left.\frac{(\vec{r}_{n_s}^s-\vec{r}_{n_s}^s)^T\cdot(\hat{r}-\vec{\beta}\cdot\hat{r}_{MB})+(\vec{r}_{n_s,n_e}^e-\vec{r}_{n_s,n_e}^e)^T\cdot(\hat{r}-\vec{\gamma}\cdot\hat{r}_{MB})}{c_0}\right]\right)$$

(Equation 2.9.1)

$$R_{Tx}(\tau)=\frac{P_g\cdot\vec{\omega}_B}{2\cdot\pi}\cdot\overline{EP}(\hat{r}_{MB},\hat{r}_{e_{MB}},\omega_{cw})\cdot\sum_{\vec{n}_s=0}^{\vec{N}_s-1}\sum_{\vec{n}_s=0}^{\vec{N}_s-1}\left\{\begin{array}{ll}1 & \text{if }\eta=0\\ \delta_{\vec{n}_s,\vec{n}_s} & \text{if }\eta=1\end{array}\right\}\cdot$$

$$\sum_{\vec{m}=0}^{\overline{M}-1}\sum_{\vec{m}=0}^{\overline{M}-1}\vec{w}^*_{\vec{n}_s,\vec{m}}\cdot\vec{w}_{\vec{n}_s,\vec{m}}\cdot\sum_{\vec{n}_e=0}^{\vec{N}_e(\vec{n}_s)-1}\sum_{\vec{n}_e=0}^{N_e(\vec{n}_s)-1}\vec{a}^*_{\vec{n}_e,\vec{n}_s}\cdot$$

$$\vec{a}_{\vec{n}_e,\vec{n}_s}\cdot e^{-j\omega_{cw}\left[\tau_{\alpha_{\vec{n}_s,\vec{n}_e}}(\hat{r}_{MB})-\tau_{\alpha_{\vec{n}_s,\vec{n}_e}}(\hat{r}_{MB})\right]}\cdot$$

$$\mathrm{sinc}\left[\frac{\vec{\omega}_B}{2}\cdot\left(\tau+(\vec{m}-\vec{m})\cdot\Delta t+\right.\right.$$

$$\left.\left.\tau_{\beta_{\vec{n}_s,\vec{n}_e}}(\hat{r}_{MB},\hat{r}_{MB})-\tau_{\beta_{\vec{n}_s,\vec{n}_e}}(\hat{r}_{MB},\hat{r}_{MB})\right)\right]$$

(Equation 2.10.1)

$$S_{Tx}(\omega)=P_g\cdot\overline{EP}(\hat{r}_{MB},\hat{r}_{e_{MB}},\omega_{cw})\cdot\Pi\left(\frac{\omega}{\vec{\omega}_B}\right)\cdot\sum_{\vec{n}_s=0}^{\vec{N}_s-1}\sum_{\vec{n}_s=0}^{\vec{N}_s-1}\left\{\begin{array}{ll}1 & \text{if }\eta=0\\ \delta_{\vec{n}_s,\vec{n}_s} & \text{if }\eta=1\end{array}\right\}\cdot$$

$$\sum_{\vec{m}=0}^{\overline{M}-1}\sum_{\vec{m}=0}^{\overline{M}-1}\vec{w}^*_{\vec{n}_s,\vec{m}}\cdot\vec{w}_{\vec{n}_s,\vec{m}}\cdot\sum_{\vec{n}_e=0}^{\vec{N}_e(\vec{n}_s)-1}\sum_{\vec{n}_e=0}^{N_e(\vec{n}_s)-1}\vec{a}^*_{\vec{n}_e,\vec{n}_s}\cdot$$

$$\vec{a}_{\vec{n}_e,\vec{n}_s}\cdot e^{j\cdot\omega_{cw}\left[\tau_{\alpha_{\vec{n}_s,\vec{n}_e}}(\hat{r}_{MB})-\tau_{\alpha_{\vec{n}_s,\vec{n}_e}}(\hat{r}_{MB})\right]}\cdot$$

$$e^{j\omega\left[(\vec{m}-\vec{m})\cdot\Delta t+\tau_{\beta_{\vec{n}_s,\vec{n}_e}}(\hat{r}_{MB},\hat{r}_{MB})-\tau_{\beta_{\vec{n}_s,\vec{n}_e}}(\hat{r}_{MB},\hat{r}_{MB})\right]}$$

(Equation 3.2.1)

$$P_{Tx}(\hat{r},\hat{r}_{MB})=\frac{P_g\cdot\omega_B}{N_e^2}\cdot\hat{r}^T\cdot\hat{z}\cdot\sum_{\vec{n}_s=0}^{N_s-1}\sum_{\vec{n}_s=0}^{N_s-1}\left\{\begin{array}{ll}1 & \text{if }\eta=0\\ \delta_{\vec{n}_s,\vec{n}_s} & \text{if }\eta=1\end{array}\right\}\cdot$$

$$\sum_{\vec{m}=0}^{\overline{M}-1}\sum_{\vec{m}=0}^{\overline{M}-1}\vec{w}^*_{\vec{n}_s,\vec{m}}\cdot\vec{w}_{\vec{n}_s,\vec{m}}\cdot e^{-j\frac{\omega_c}{c_0}\cdot(\vec{r}_{n_s}^s-\vec{r}_{n_s}^s)^T\cdot(\hat{r}-\hat{r}_{MB})}\cdot$$

$$\sum_{\vec{n}_e=0}^{N_e-1}\sum_{\vec{n}_e=0}^{N_e-1}e^{-j\omega_c\cdot\frac{(\vec{r}_{n_e}^e-\vec{r}_{n_e}^e)^T\cdot(\hat{r}-\hat{r}_{MB})}{c_0}}\cdot\mathrm{sinc}\left(\left[\pi\cdot(\vec{m}-\vec{m})+\right.\right.$$

$$\left.\left.\frac{\omega_B}{2\cdot c_0}\cdot(\vec{r}_{n_s}^s-\vec{r}_{n_s}^s+\vec{r}_{n_e}^e-\vec{r}_{n_e}^e)^T\cdot(\hat{r}-\hat{r}_{MB})\right]\right)$$

(Equation 3.2.2)

$$S=\frac{P_g\cdot D_T\cdot\omega_B\cdot(\hat{r}_{MB}^T\cdot\hat{z})^2}{N_s^2}\cdot$$

$$\sum_{\vec{n}'_s=0}^{N_s-1}\sum_{\vec{n}_s=0}^{N_s-1}\sum_{\vec{n}'_s=0}^{N_s-1}\sum_{\vec{n}_s=0}^{N_s-1}\sum_{\vec{n}'_s=0}^{N_s-1}\sum_{\vec{n}_s=0}^{N_s-1}\sum_{\vec{n}'_s=0}^{N_s-1}\sum_{\vec{n}_s=0}^{N_s-1}\sum_{\vec{m}'=0}^{\overline{M}-1}\sum_{\vec{m}=0}^{\overline{M}-1}\sum_{\vec{m}'=0}^{\overline{M}-1}\sum_{\vec{m}=0}^{\overline{M}-1}$$

$$\left\{\begin{array}{ll}1 & \text{if }\eta=0\\ \delta_{\vec{n}'_s,\vec{n}_s}\cdot\delta_{\vec{n}_s,\vec{n}_s} & \text{if }\eta=1\end{array}\right\}\cdot\vec{w}_{\vec{n}'_s,\vec{m}'}\cdot\vec{w}^*_{\vec{n}_s,\vec{m}}\cdot\vec{w}^*_{\vec{n}'_s,\vec{m}'}\cdot\vec{w}_{\vec{n}_s,\vec{m}}\cdot$$

$$\mathrm{sinc}\left[\pi\cdot(\vec{m}'-\vec{m}-\vec{m}'+\vec{m})+\frac{\omega_B}{2\cdot c_0}\cdot\right.$$

$$\left.(\vec{r}_{n_s}^s-\vec{r}_{n_s}^s-\vec{r}_{n'_s}^s+\vec{r}_{n'_s}^s+\vec{r}_{n'_s}^s-\vec{r}_{n_s}^s-\vec{r}_{n'_s}^s+\vec{r}_{n_s}^s)^T\cdot\hat{r}_{MB}\right]$$

(Equation 3.2.4)

$$J=\frac{P_g\cdot\omega_B}{N_s^2\cdot N_e^4}\cdot\sum_{j=0}^{J-1}D_{J_j}\cdot(\hat{r}_{J_j}^T\cdot\hat{z})^2\cdot$$

-continued $$\sum_{\vec{n}'_s=0}^{N_S-1}\sum_{\vec{n}_s=0}^{N_S-1}\sum_{\vec{n}'_s=0}^{N_S-1}\sum_{\vec{n}_s=0}^{N_S-1}\sum_{\vec{n}'_s=0}^{N_S-1}\sum_{\vec{n}_s=0}^{N_S-1}\sum_{\vec{n}'_s=0}^{N_S-1}\sum_{\vec{n}_s=0}^{N_S-1}\sum_{\vec{m}'=0}^{\vec{M}-1}\sum_{\vec{m}=0}^{\vec{M}-1}\sum_{\vec{m}'=0}^{\vec{M}-1}\sum_{\vec{m}=0}^{\vec{M}-1}$$

$$\left\{ \begin{matrix} 1 & \text{if } \eta=0 \\ \delta_{\vec{n}'_s,\vec{n}_s}\cdot\delta_{\vec{n}_s,\vec{n}_s} & \text{if } \eta=1 \end{matrix} \right\} \cdot \vec{w}_{\vec{n}'_s,\vec{m}'}\cdot\vec{w}^*_{\vec{n}_s,\vec{m}}\cdot\vec{w}^*_{\vec{n}'_s,\vec{m}'}\cdot\vec{w}_{\vec{n}_s,\vec{m}}\cdot$$

$$e^{j\frac{\omega_C}{c_0}\left(\vec{r}^{\,s}_{\vec{n}'_s}-\vec{r}^{\,s}_{\vec{n}_s}+\vec{r}^{\,s}_{\vec{n}'_s}-\vec{r}^{\,s}_{\vec{n}_s}\right)^T\cdot(\hat{r}_{J_j}-\hat{r}_{MB})}\cdot$$

$$\sum_{\vec{n}_e=0}^{N_e-1}\sum_{\vec{n}_e=0}^{N_e-1}\sum_{\vec{n}_e=0}^{N_3-1}\sum_{\vec{n}_e=0}^{N_e-1}\text{sinc}\left[\pi\cdot(\vec{m}'-\vec{m}-\vec{m}'+\vec{m})+\frac{\omega_B}{2\cdot c_0}\cdot\right.$$

$$\left(2\cdot\vec{r}^{\,s}_{\vec{n}_s}-2\cdot\vec{r}^{\,s}_{\vec{n}_s}+3\cdot\vec{r}^{\,s}_{\vec{n}_s}-3\cdot\vec{r}^{\,s}_{\vec{n}_s}\right)^T\cdot(\hat{r}_{J_j}-\hat{r}_{MB})+\frac{\omega_B}{2\cdot c_0}\cdot$$

$$\left(\left(\vec{r}^{\,s}_{\vec{n}'_s}-\vec{r}^{\,s}_{\vec{n}_s}-\vec{r}^{\,s}_{\vec{n}'_s}+\vec{r}^{\,s}_{\vec{n}_s}+\vec{r}^{\,s}_{\vec{n}'_s}-\vec{r}^{\,s}_{\vec{n}_s}-\vec{r}^{\,s}_{\vec{n}'_s}+\vec{r}^{\,s}_{\vec{n}_s}\right)^T\cdot\hat{r}_{MB}+\right.$$

$$\left.\left(\vec{r}^{\,e}_{\vec{n}_e}-\vec{r}^{\,e}_{\vec{n}_e}+\vec{r}^{\,e}_{\vec{n}_e}-\vec{r}^{\,e}_{\vec{n}_e}\right)^T\cdot(\hat{r}_{J_j}-\hat{r}_{MB})\right)\right]$$

(Equation 3.2.6)

$$R_{Tx}(\tau) = \frac{P_g\cdot\omega_B}{2\cdot\pi}\cdot\hat{r}^T_{MB}\cdot\hat{z}\cdot$$

$$\sum_{\vec{n}_s=0}^{N_S-1}\sum_{\vec{n}_s=0}^{N_S-1}\left\{\begin{matrix}1 & \text{if } \eta=0 \\ \delta_{\vec{n}_s,\vec{n}_s} & \text{if } \eta=1\end{matrix}\right\}\cdot\sum_{\vec{m}=0}^{\vec{M}-1}\sum_{\vec{m}=0}^{\vec{M}-1}\vec{w}^*_{\vec{n}_s,\vec{m}}\cdot\vec{w}_{\vec{n}_s,\vec{m}}\cdot$$

$$\text{sinc}\left[\pi\cdot(\vec{m}-\vec{m})+\frac{\omega_B}{2}\cdot\left(\tau+\frac{(\vec{r}^{\,s}_{\vec{n}_s}-\vec{r}^{\,s}_{\vec{n}_s})^T\cdot\hat{r}_{MB}}{c_0}\right)\right]$$

(Equation 3.2.7)

$$S_{Tx}(\omega) = P_g\cdot\hat{r}^T_{MB}\cdot\hat{z}\cdot\Pi\left(\frac{\omega}{\omega_B}\right)\cdot\sum_{\vec{n}_s=0}^{N_S-1}\sum_{\vec{n}_s=0}^{N_S-1}\left\{\begin{matrix}1 & \text{if } \eta=0 \\ \delta_{\vec{n}_s,\vec{n}_s} & \text{if } \eta=1\end{matrix}\right\}\cdot$$

$$\sum_{\vec{m}=0}^{\vec{M}-1}\sum_{\vec{m}=0}^{\vec{M}-1}\vec{w}^*_{\vec{n}_s,\vec{m}}\cdot\vec{w}_{\vec{n}_s,\vec{m}}\cdot e^{j\omega\left[(\vec{m}-\vec{m})\Delta t+\frac{(\vec{r}^{\,s}_{\vec{n}_s}-\vec{r}^{\,s}_{\vec{n}_s})^T\cdot\hat{r}_{MB}}{c_0}\right]}$$

(Equation 3.2.8)

$$NSNJR = \frac{1}{1+\frac{1}{N_s^3\cdot N_e}\cdot\frac{\sum_{j=0}^{J-1}NPJ_j\cdot\hat{r}^T_{J_j}\cdot\hat{z}\cdot\Upsilon_j(\hat{r}_{MB},\vec{w})}{\sum_{\vec{n}'_s=0}^{N_S-1}\sum_{\vec{n}_s=0}^{N_S-1}\sum_{\vec{m}'=0}^{\vec{M}-1}\sum_{\vec{m}'=0}^{\vec{M}-1}\vec{w}_{\vec{n}'_s,\vec{m}'}\cdot\vec{w}^*_{\vec{n}_s,\vec{m}'}}}$$

Where:

$$\Upsilon_j(\hat{r}_{MB},\vec{w}) = \frac{\sum_{\vec{n}'_s=0}^{N_S-1}\sum_{\vec{n}_s=0}^{N_S-1}\sum_{\vec{n}'_s=0}^{N_S-1}\sum_{\vec{n}_s=0}^{N_S-1}\Lambda_{\vec{n}'_s,\vec{n}_s,\vec{n}'_s,\vec{n}_s}(\eta)\cdot \sum_{\vec{n}'_s=0}^{N_S-1}\sum_{\vec{n}_s=0}^{N_S-1}\sum_{\vec{n}'_s=0}^{N_S-1}\sum_{\vec{n}_s=0}^{N_S-1}\Psi_{\vec{n}'_s,\vec{n}_s,\vec{n}_s,\vec{n}_s,j}(\hat{r}_{MB})\cdot \sum_{\vec{m}'=0}^{\vec{M}-1}\sum_{\vec{m}=0}^{\vec{M}-1}\sum_{\vec{m}'=0}^{\vec{M}-1}\sum_{\vec{m}=0}^{\vec{M}-1}\vec{w}_{\vec{n}'_s,\vec{m}'}\cdot\vec{w}^*_{\vec{n}_s,\vec{m}}\cdot\vec{w}^*_{\vec{n}'_s,\vec{m}'}\cdot\vec{w}_{\vec{n}_s,\vec{m}}\cdot \overleftrightarrow{\psi}_{\vec{m}',\vec{m},\vec{m}',\vec{m},\vec{n}'_s,\vec{n}_s,\vec{n}'_s,\vec{n}_s,\vec{n}'_s,\vec{n}_s}(\hat{r}_{MB})}{\sum_{\vec{n}_s=0}^{N_S-1}\sum_{\vec{n}_s=0}^{N_S-1}\Lambda'_{\vec{n}_s,\vec{n}_s}(\eta)\cdot \sum_{\vec{m}=0}^{\vec{M}-1}\sum_{\vec{m}=0}^{\vec{M}-1}\vec{w}^*_{\vec{n}_s,\vec{m}}\cdot\vec{w}_{\vec{n}_s,\vec{m}}\cdot\vec{\psi}_{\vec{m},\vec{m},\vec{n}_s,\vec{n}_s,j}(\hat{r}_{MB})}$$

Where:

$$\Lambda_{\vec{n}'_s,\vec{n}_s,\vec{n}'_s,\vec{n}_s}(\eta) = 1-\eta\cdot\left(1-\delta_{\vec{n}'_s,\vec{n}_s}\cdot\delta_{\vec{n}'_s,\vec{n}_s}\right)$$

$$\Lambda'_{\vec{n}'_s,\vec{n}_s}(\eta) = 1-\eta\cdot\left(1-\delta_{\vec{n}'_s,\vec{n}_s}\right)$$

$$\Psi_{\vec{n}'_s,\vec{n}_s,\vec{n}'_s,\vec{n}_s,j}(\hat{r}_{MB}) = e^{j\frac{\omega_C}{c_0}\left(\vec{r}^{\,s}_{\vec{n}'_s}-\vec{r}^{\,s}_{\vec{n}_s}+\vec{r}^{\,s}_{\vec{n}'_s}-\vec{r}^{\,s}_{\vec{n}_s}\right)^T\cdot(\hat{r}_{J_j}-\hat{r}_{MB})}$$

$$\vec{\psi}_{\vec{m},\vec{m},\vec{n}_s,\vec{n}_s,j}(\hat{r}_{MB}) = e^{-j\frac{\omega_C}{c_0}\left(\vec{r}^{\,s}_{\vec{n}_s}-\vec{r}^{\,s}_{\vec{n}_s}\right)^T\cdot(\hat{r}_{J_j}-\hat{r}_{MB})}\cdot\sum_{\vec{n}_e=0}^{N_e-1}\sum_{\vec{n}_e=0}^{N_e-1}e^{-j\frac{\omega_C}{c_0}\left(\vec{r}^{\,e}_{\vec{n}_e}-\vec{r}^{\,e}_{\vec{n}_e}\right)^T\cdot(\hat{r}_{J_j}-\hat{r}_{MB})}\cdot$$

$$\text{sinc}\left(\left[\pi\cdot(\vec{m}-\vec{m})\frac{\omega_B}{2\cdot c_0}\cdot\left(\vec{r}^{\,s}_{\vec{n}_s}-\vec{r}^{\,s}_{\vec{n}_s}+\vec{r}^{\,e}_{\vec{n}_e}-\vec{r}^{\,e}_{\vec{n}_e}\right)^T\cdot(\hat{r}_{J_j}-\hat{r}_{MB})\right]\right)$$

$$\psi_{\vec{m}',\vec{m},\vec{m}',\vec{m},\vec{n}'_s,\vec{n}_s,\vec{n}'_s,\vec{n}_s,\vec{n}'_s,\vec{n}_s,\vec{n}'_s,\vec{n}_s,j}(\hat{r}_{MB}) =$$

$$\sum_{\vec{n}_e=0}^{N_e-1}\sum_{\vec{n}_e=0}^{N_e-1}\sum_{\vec{n}_e=0}^{N_e-1}\sum_{\vec{n}_e=0}^{N_e-1}\text{sinc}\left(A_{\vec{m}',\vec{m},\vec{m}',\vec{m}}+\right.$$

$$\left.B_{\vec{n}'_s,\vec{n}_s,\vec{n}'_s,\vec{n}_s,\vec{n}_e,\vec{n}_e,\vec{n}_e,\vec{n}_e,j}(\hat{r}_{MB})+\Gamma_{\vec{n}'_s,\vec{n}_s,\vec{n}'_s,\vec{n}_s,\vec{n}'_s,\vec{n}_s,\vec{n}'_s,\vec{n}_s}(\hat{r}_{MB})\right)$$

Where:

$$A_{\vec{m}',\vec{m},\vec{m}',\vec{m}} = \pi\cdot(\vec{m}'-\vec{m}-\vec{m}'+\vec{m})$$

$$B_{\vec{n}'_s,\vec{n}_s,\vec{n}'_s,\vec{n}_s,\vec{n}_e,\vec{n}_e,\vec{n}_e,\vec{n}_e,j}(\hat{r}_{MB}) = \frac{\omega_B}{2\cdot c_0}\cdot$$

$$\left(2\cdot\vec{r}^{\,s}_{\vec{n}_s}-2\cdot\vec{r}^{\,s}_{\vec{n}_s}+3\cdot\vec{r}^{\,s}_{\vec{n}_s}-3\cdot\vec{r}^{\,s}_{\vec{n}_s}+\vec{r}^{\,e}_{\vec{n}_e}-\vec{r}^{\,e}_{\vec{n}_e}+\vec{r}^{\,e}_{\vec{n}_e}-\vec{r}^{\,e}_{\vec{n}_e}\right)^T\cdot$$

$$(\hat{r}_{J_j}-\hat{r}_{MB})$$

$$\Gamma_{\vec{n}'_s,\vec{n}_s,\vec{n}'_s,\vec{n}_s,\vec{n}'_s,\vec{n}_s,\vec{n}'_s,\vec{n}_s}(\hat{r}_{MB}) =$$

$$\frac{\omega_B}{2\cdot c_0}\cdot\left(\vec{r}^{\,s}_{\vec{n}'_s}-\vec{r}^{\,s}_{\vec{n}_s}-\vec{r}^{\,s}_{\vec{n}'_s}+\vec{r}^{\,s}_{\vec{n}_s}+\vec{r}^{\,s}_{\vec{n}'_s}-\vec{r}^{\,s}_{\vec{n}_s}-\vec{r}^{\,s}_{\vec{n}'_s}+\vec{r}^{\,s}_{\vec{n}_s}\right)^T\cdot$$

$$\hat{r}_{MB}$$

The invention claimed is:

1. A radar system for suppressing at least one of repetition jammer signals or clutter signals, said radar system comprising:
   at least one wideband arbitrary waveform generator, for creating arbitrary waveforms; and
   at least one antenna operating with wide instantaneous bandwidth, enabling direction dependent waveform radiation;
   wherein said radar system is configured to transmit different waveforms in different directions depending on received waveforms, such that a normalized signal to noise-jammer ratio, NSNJR, is maximized, which provides that received signals from the at least one repetition jammers or clutter are substantially orthogonal to a received signal from a target and thereby achieving suppression of the at least one repetition jammers or clutter.

2. A radar system according to claim 1, wherein said wideband arbitrary waveform generator comprises a noise generator (NG), and FIR-filters comprising FIR-filter coefficients.

3. A radar system according to claim 1, wherein said antenna is a large antenna configured for operation with wide instantaneous bandwidth.

4. A radar system according to claim 1, wherein values for said FIR-filter coefficients are configured to maximize the normalized signal to noise-jammer ratio (NSNJR).

5. A radar system according to claim 4, wherein said maximized normalized signal to noise-jammer ratio (NSNJR) is obtained after convergence of an iterative process performed for the transmit FIR-filter coefficients values, where the FIR-filter coefficients values are optimized to obtain the maximized NSNJR.

6. A radar system according to claim 1, wherein said maximized normalized signal to noise-jammer ratio (NSNJR) is obtained after solution of a FIR-filter coefficient equation, where the FIR-filter coefficients values are optimized to obtain the maximized NSNJR.

7. A radar system according to claim 1, wherein said wideband arbitrary waveform generator comprises one noise generator connected to several FIR-filters.

8. A radar system according to claim 1, wherein said wideband arbitrary waveform generators are uncorrelated noise sources with one noise source connected to each FIR-filter.

9. A method for suppressing at least one of repetition jammer signals or clutter signals by using a radar system comprising at least one wideband arbitrary waveform generator, for creating arbitrary waveforms, and at least one antenna operating with wide instantaneous bandwidth, enabling direction dependent waveform radiation, said method comprising the steps of:
   transmitting different waveforms in different directions;
   adapting transmitted waveforms in different directions depending on received waveforms such that a normalized signal to noise-jammer ratio (NSNJR) is maximized;
   providing received signals from the at least one of repetition jammers or clutter that are substantially orthogonal to a received signal from a target; and
   achieving suppression of the repetition jammers and/or clutter.

10. A method according to claim 9, wherein said wideband arbitrary waveform generator comprises a noise generator (NG) and FIR-filters (22) comprising FIR-filter coefficients.

11. A method according to claim 9, wherein said antenna is a large antenna configured for operation with wide instantaneous bandwidth.

12. A method according to claim 9, wherein said adapting of the transmitted waveforms in different directions depending on received waveforms such that a normalized signal to noise-jammer ratio (NSNJR) is maximized, is accomplished by adapting said FIR-filter coefficients.

13. A method according to claim 12, wherein said maximized normalized signal to noise-jammer ratio (NSNJR) is obtained by iteratively converging and optimizing the transmit FIR-filter coefficients values.

14. A method according to claim 12, wherein said maximized normalized signal to noise-jammer ratio, NSNJR, is obtained by solving a FIR-filter coefficient equation, where the FIR-filter coefficients values are optimized to obtain the maximized NSNJR.

15. A method according to claim 9, wherein said wideband arbitrary waveform generator comprises one noise generator connected to several FIR-filters.

16. A method according to claim 9, wherein said wideband arbitrary waveform generators are uncorrelated noise sources with one noise source connected to each FIR-filter.

* * * * *

UNITED STATES PATENT AND TRADEMARK OFFICE
CERTIFICATE OF CORRECTION

PATENT NO. : 9,170,321 B2  Page 1 of 1
APPLICATION NO. : 13/883927
DATED : October 27, 2015
INVENTOR(S) : Falk It is certified that error appears in the above-identified patent and that said Letters Patent is hereby corrected as shown below:

Title Page, Item (54) and in the Specification, Column 1

"METHOD AND RADAR SYSTEM FOR REPETITION JAMMER AND CLUTTER SUPRESSION" should read

--METHOD AND RADAR SYSTEM FOR REPETITION JAMMER AND CLUTTER SUPPRESSION--

Signed and Sealed this
Twenty-ninth Day of March, 2016

Michelle K. Lee
*Director of the United States Patent and Trademark Office*